United States Patent
Sato et al.

(10) Patent No.: US 11,433,686 B2
(45) Date of Patent: Sep. 6, 2022

(54) METHOD OF PRODUCING RECORDING MEDIUM AND IMAGE RECORDING METHOD

(71) Applicant: FUJIFILM CORPORATION, Tokyo (JP)

(72) Inventors: Ayato Sato, Kanagawa (JP); Yusuke Fujii, Kanagawa (JP); Takeshi Miyato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/939,083

(22) Filed: Jul. 27, 2020

(65) Prior Publication Data
US 2020/0353756 A1    Nov. 12, 2020

Related U.S. Application Data

(63) Continuation of application No. PCT/JP2018/048356, filed on Dec. 27, 2018.

(30) Foreign Application Priority Data

Feb. 5, 2018    (JP) .............................. JP2018-018590

(51) Int. Cl.
*B41J 2/21*    (2006.01)
*B41J 2/175*    (2006.01)
(Continued)

(52) U.S. Cl.
CPC .............. *B41J 2/211* (2013.01); *B41J 2/175* (2013.01); *B41J 11/0015* (2013.01); *B41M 5/0047* (2013.01); *B41M 5/0064* (2013.01)

(58) Field of Classification Search
CPC ........ B41J 2/211; B41J 2/175; B41J 11/0015; B41M 5/0017; B41M 5/0047; B41M 5/0064

See application file for complete search history.

(56) References Cited

U.S. PATENT DOCUMENTS

2004/0135864 A1    7/2004 Ogino et al.
2008/0090949 A1    4/2008 Nagao et al.
(Continued)

FOREIGN PATENT DOCUMENTS

CA    2951475 A1    6/2017
CN    1496858 A    5/2004
(Continued)

OTHER PUBLICATIONS

Extended European Search Report dated Mar. 29, 2021, issued in corresponding EP Patent Application No. 18904416.7.
(Continued)

*Primary Examiner* — Matthew Luu
*Assistant Examiner* — Kendrick X Liu
(74) *Attorney, Agent, or Firm* — SOLARIS Intellectual Property Group, PLLC

(57) ABSTRACT

Provided are a method of producing a recording medium, including a step of preparing a liquid A which includes at least one kind of aggregating agent selected from the group consisting of an acid, a polyvalent metal compound, and a metal complex, and water, a step of preparing a liquid B which includes a resin and water, a step of mixing the liquid A with the liquid B at an ambient temperature of 5° C. to 40° C. to obtain a mixed solution, a step of storing the mixed solution at an ambient temperature of 5° C. to 40° C., and a step of applying the mixed solution after the storage onto an impermeable base material within 30 days from the start of mixing the liquid A with the liquid B to obtain a recording medium; and an image recording method.

9 Claims, 2 Drawing Sheets

(51) Int. Cl.
B41J 11/00 (2006.01)
B41M 5/00 (2006.01)

(56) References Cited

U.S. PATENT DOCUMENTS

| | | | |
|---|---|---|---|
| 2010/0045760 A1* | 2/2010 | Kawakami | B41J 11/00216 347/100 |
| 2010/0209677 A1 | 8/2010 | Sano et al. | |
| 2011/0104409 A1 | 5/2011 | Mittelstadt et al. | |
| 2013/0034656 A1 | 2/2013 | Sarkisian et al. | |
| 2013/0076842 A1 | 3/2013 | Sarkisian et al. | |
| 2013/0101814 A1 | 4/2013 | Gotou et al. | |
| 2013/0316232 A1 | 11/2013 | Iijima et al. | |
| 2015/0091974 A1* | 4/2015 | Aoyama | B41M 5/0011 347/21 |
| 2016/0023456 A1 | 1/2016 | Yoneyama et al. | |
| 2016/0312053 A1* | 10/2016 | Yano | C09D 11/10 |
| 2017/0088739 A1* | 3/2017 | Yamashita | B41M 5/5227 |
| 2017/0159488 A1 | 6/2017 | Kottilingam et al. | |
| 2017/0159574 A1 | 6/2017 | Paul et al. | |
| 2017/0166318 A1 | 6/2017 | Holt et al. | |
| 2017/0211529 A1 | 7/2017 | Kimura et al. | |
| 2017/0211584 A1 | 7/2017 | Taguchi et al. | |
| 2017/0218882 A1 | 8/2017 | Jackowski et al. | |
| 2017/0355868 A1* | 12/2017 | Saiga | C09D 11/322 |
| 2018/0311986 A1 | 11/2018 | Moriyama | |
| 2019/0016911 A1* | 1/2019 | Okamoto | B41M 5/0017 |
| 2019/0085193 A1* | 3/2019 | Ushiku | B41M 5/0017 |
| 2020/0172754 A1* | 6/2020 | Okamoto | B41J 2/01 |

FOREIGN PATENT DOCUMENTS

| | | | |
|---|---|---|---|
| CN | 1961015 | A | 5/2007 |
| CN | 101746175 | A | 6/2010 |
| CN | 102933396 | A | 2/2013 |
| CN | 102971386 | A | 3/2013 |
| CN | 103384697 | A | 11/2013 |
| CN | 106870201 | A | 6/2017 |
| CN | 106935116 | A | 7/2017 |
| CN | 106996391 | A | 8/2017 |
| CN | 107013365 | A | 8/2017 |
| CN | 107023322 | A | 8/2017 |
| CN | 107044367 | A | 8/2017 |
| EP | 1298173 | A1 | 4/2003 |
| EP | 2857213 | A1 | 4/2015 |
| EP | 2907670 | A2 | 8/2015 |
| EP | 2944476 | A1 | 11/2015 |
| JP | 2002-19263 | A | 1/2002 |
| JP | 2007-229705 | A | 9/2007 |
| JP | 2010-046945 | A | 3/2010 |
| JP | 2011-25504 | A | 2/2011 |
| JP | 2013-043364 | A | 3/2013 |
| JP | 2014-076619 | A | 5/2014 |
| JP | 2016-030337 | A | 3/2016 |
| JP | 2017-013349 | A | 1/2017 |
| JP | 2017013349 | A * | 1/2017 |
| JP | 2017-114934 | A | 6/2017 |
| JP | 2017-133490 | A | 8/2017 |
| JP | 2017-133492 | A | 8/2017 |
| JP | 2017-222833 | A | 12/2017 |
| WO | 2014-058029 | A2 | 4/2014 |
| WO | 2017/013983 | A1 | 1/2017 |
| WO | 2017/069077 | A1 | 4/2017 |
| WO | 2017/159124 | A1 | 9/2017 |

OTHER PUBLICATIONS

International Search Report issued in International Application No. PCT/JP2018/048356 dated Mar. 12, 2019.
Written Opinion of the ISA issued in International Application No. PCT/JP2018/048356 dated Mar. 12, 2019.
International Preliminary Report on Patentability issued in International Application No. PCT/JP2018/048356 dated Sep. 2, 2019.
English language translation of the following: Office action dated Aug. 31, 2021 from the JPO in a Japanese patent application No. 2019-568949 corresponding to the instant patent application.
English language translation of the following: Written Submission of Publications dated Nov. 2, 2021 from the JPO in a Japanese patent application No. 2019-568949 corresponding to the instant patent application.
English language translation of the following: Office action dated Mar. 3, 2022 from the SIPO in a Chinese patent application No. 201880088166 X corresponding to the instant patent application. This office action translation is submitted now in order to supplement the understanding of the cited references which are being disclosed in the instant Information Disclosure Statement.
English language translation of the following: Office action dated Mar. 1, 2022 from the JPO in a Japanese patent application No. 2019-568949 corresponding to the instant patent application This office action translation is submitted now in order to supplement the understanding of the cited references which are being disclosed in the instant Information Disclosure Statement.

* cited by examiner

METHOD OF PRODUCING RECORDING MEDIUM AND IMAGE RECORDING METHOD

CROSS-REFERENCE TO RELATED APPLICATIONS

This application is a continuation application of International Application No. PCT/JP2018/048356, filed Dec. 27, 2018, the disclosure of which is incorporated herein by reference in its entirety. Further, this application claims priority from Japanese Patent Application No. 2018-018590, filed Feb. 5, 2018, the disclosure of which is incorporated herein by reference in its entirety.

BACKGROUND OF THE INVENTION

1. Field of the Invention

The present disclosure relates to a method of producing a recording medium and an image recording method.

2. Description of the Related Art

In the related art, various examinations on a technique for recording an image on a recording medium using a plurality of liquids including ink have been conducted.

For example, JP2013-043364A discloses, as a technique for printing a printed material having a desired gloss using typical printing paper in a stabilized state for a long period of time without using a coating solution including a dispersant capable of maintaining a dispersed state of inorganic fine particles for a long period of time, an ink jet method comprising a coating solution generating step of mixing a dispersion liquid in which inorganic fine particles having light reflectivity are dispersed with a binder aqueous solution in an ink jet device to generate a coating solution; a coating step of coating the base material with the coating solution in the ink jet device in a preset time determined according to an aggregation time of the inorganic fine particles in the coating solution after the generation of the coating solution; and a jetting step of allowing ink in the ink jet device to be jetted to the base material coated with the coating solution.

JP2007-229705A discloses, as a method suitable for formation of a high-density pattern using two kinds of liquid agents that start a reaction by being mixed, a method of forming a pattern on a base material using an ink jet type liquid droplet jetting device that has a first nozzle and a second nozzle, the method comprising a first liquid jetting step of allowing a first liquid to be jetted from the first nozzle and allowing the first liquid to land on the base material; and a second liquid jetting step of allowing a second liquid that reacts with the first liquid to be jetted from the second nozzle and allowing the second liquid to land on the same position as the landing position of the first liquid in the first liquid jetting step.

JP2007-229705A also discloses that the second liquid includes a solution in which ammonium sulfate is dissolved in ammonia water.

SUMMARY OF THE INVENTION

Meanwhile, from the viewpoint of improving the image quality of an image recorded on a recording medium and the adhesiveness between the image and the recording medium (hereinafter, also simply referred to as the "adhesiveness of the image" or the "adhesiveness"), as the recording medium, a recording medium produced by applying a resin and at least one kind of aggregating agent (hereinafter, also referred to as a "specific aggregating agent") selected from the group consisting of an acid, a polyvalent metal compound, and a metal complex onto one surface (hereinafter, also referred to as a "front surface") of an impermeable base material is used in some cases. Here, the specific aggregating agent is a component that contributes to improving the image quality of the image, and the resin is a component that contributes to the adhesiveness of the image.

However, in a case where such a recording medium is used, a component (for example, a specific aggregating agent) on a side of the front surface of the recording medium is transferred to an object in contact with the side of the front surface thereof. Here, the side of the front surface of the recording medium indicates a side corresponding to the front surface of the base material.

JP2013-043364A discloses a technique for forming a printed material having a gloss with respect to printing paper, but does not describe an impermeable base material and a specific aggregating agent. Therefore, the transfer of a component in a case of using an impermeable base material and a specific aggregating agent has not been considered at all.

An object of one aspect of the present disclosure is to provide a method of producing a recording medium, which enables production of a recording medium which has an excellent image quality of an image to be recorded and excellent adhesiveness of the image and in which transfer of a component is suppressed.

Further, an object of another aspect of the present disclosure is to provide an image recording method which enables recording of an image having an excellent image quality and excellent adhesiveness and enables suppression of transfer of a component of a recording medium.

Specific means for achieving the above-described objects includes the following aspects.

<1> A method of producing a recording medium, comprising: a step of preparing a liquid A which includes at least one kind of aggregating agent selected from the group consisting of an acid, a polyvalent metal compound, and a metal complex, and water; a step of preparing a liquid B which includes a resin and water; a step of mixing the liquid A with the liquid B at an ambient temperature of 5° C. to 40° C. to obtain a mixed solution; a step of storing the mixed solution at an ambient temperature of 5° C. to 40° C.; and a step of applying the mixed solution after the storage onto an impermeable base material within 30 days from start of mixing the liquid A with the liquid B, thereby obtaining a recording medium.

<2> The method of producing a recording medium according to <1>, in which the step of obtaining the recording medium is a step of applying the mixed solution after the storage onto the impermeable base material after 30 minutes and within 10 days from the start of mixing the liquid A with the liquid B to obtain a recording medium.

<3> The method of producing a recording medium according to <1> or <2>, in which the step of obtaining the mixed solution is a step of mixing the liquid A with the liquid B such that a mixing volume ratio of the liquid A to the liquid B is in a range of 0.5 to 2.5 to obtain a mixed solution.

<4> The method of producing a recording medium according to any one of <1> to <3>, in which the aggregating agent includes an organic acid.

<5> The method of producing a recording medium according to any one of <1> to <4>, in which the resin includes at least one of a polyester resin or a polyurethane resin.

<6> The method of producing a recording medium according to any one of <1> to <5>, in which in a case where a weight-average molecular weight of the resin in the liquid B after the step of preparing the liquid B and before the step of obtaining the mixed solution is set as Mw1 and a weight-average molecular weight of the resin in the mixed solution immediately before the application of the mixed solution onto the impermeable base material is set as Mw2, Mw2/Mw1 is in a range of 0.70 to 1.00.

<7> An image recording method comprising: a step of producing a recording medium using the method of producing a recording medium according to any one of <1> to <6>; and a step of applying an ink which includes a colorant and water onto the produced recording medium and recording an image.

<8> The image recording method according to <7>, in which the application of the ink is started within 60 days after the application of the mixed solution after the storage onto the impermeable base material is completed.

According to one aspect of the present disclosure, it is possible to provide a method of producing a recording medium, which enables production of a recording medium which has an excellent image quality of an image to be recorded and excellent adhesiveness and in which transfer of a component is suppressed.

Further, according to another aspect of the present disclosure, it is possible to provide an image recording method which enables recording of an image having an excellent image quality and excellent adhesiveness and enables suppression of transfer of a component of a recording medium.

DESCRIPTION OF THE PREFERRED EMBODIMENTS

Figure 1:
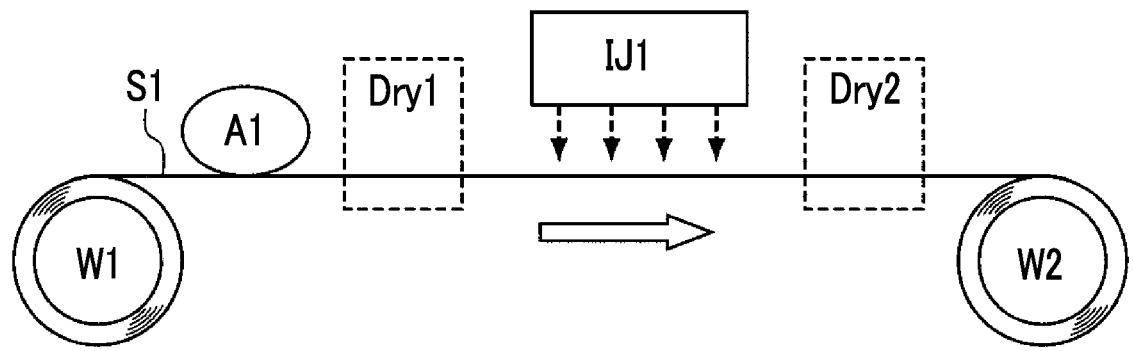
FIG. 1 is a schematic configuration view illustrating an example of a method of producing a recording medium according to the embodiment of the present disclosure and a recording medium production device having an image recording function which is suitable for implementing an image recording method.

The numerical ranges shown using "to" in the present disclosure indicate ranges including the numerical values described before and after "to" as the lower limits and the upper limits.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit or a lower limit described in a certain numerical range may be replaced with an upper limit or a lower limit in another numerical range described in a stepwise manner or with a value described in an example.

In the present disclosure, the meaning of the term "step" includes not only an independent step but also a step whose intended purpose is achieved even in a case where the step is not clearly distinguished from other steps.

In the present disclosure, the "front surface" of an impermeable base material indicates a surface on a side where a mixed solution is provided, and the "rear surface" indicates a surface on a side opposite to the front surface. The same applies to the front surface and the rear surface of a recording medium.

In the present disclosure, a combination of two or more preferable aspects is a more preferable aspect.

[Method of Producing Recording Medium]

A method of producing the recording medium according to the embodiment of the present disclosure (hereinafter, also referred to as the "production method according to the embodiment of the present disclosure") includes a step of preparing a liquid A which includes at least one kind of aggregating agent (hereinafter, also referred to as a "specific aggregating agent") selected from the group consisting of an acid, a polyvalent metal compound, and a metal complex, and water; a step of preparing a liquid B which includes a resin and water; a step of mixing the liquid A with the liquid B at an ambient temperature of 5° C. to 40° C. to obtain a mixed solution; a step of storing the mixed solution at an ambient temperature of 5° C. to 40° C.; and a step of applying the mixed solution after the storage onto an impermeable base material within 30 days from start of mixing the liquid A with the liquid B, thereby obtaining a recording medium.

In the present disclosure, the expression of "applying the mixed solution after the storage onto an impermeable base material within 30 days from the start of mixing the liquid A with the liquid B" indicates that the time taken from the start of mixing the liquid A with the liquid B to the start of application of the mixed solution onto the impermeable base material is 30 days or shorter.

That is, in the production method according to the embodiment of the present disclosure, the application of the mixed solution may be started within 30 days, but the application of the mixed solution is not necessarily completed within 30 days.

Further, in the present disclosure, the time point of "the start of mixing of the liquid A with the liquid B" indicates the time point of the start of mixing of the liquid A with the liquid B in an amount required to obtain an intended amount of the mixed solution.

That is, the time point of "the start of mixing the liquid A with the liquid B" indicates the time point at which the supply of all the required amounts of the liquid A and the liquid B into a container used for mixing the liquid A with the liquid B is completed.

Therefore, for example, the time point at which only some of the required amount of liquid A and all or some of the required amount of liquid B have been supplied into the container does not correspond to the time point of "the start of mixing the liquid A with the liquid B". Similarly, the time point at which only some of the required amount of liquid B and all or some of the required amount of liquid A have been supplied into the container does not correspond to the time point of "the start of mixing the liquid A with the liquid B". This is because neither of these two cases corresponds to the time point at which the supply of all the required amounts of the liquid A and the liquid B is completed.

In addition, the definition of the time point of "the start of mixing the liquid A with the liquid B" is not the same as the definition of the time point at which the preparation of the mixed solution is completed (the time point at which the mixing of the liquid A with the liquid B is completed). Specifically, the time point of the start of mixing the liquid A with the liquid B may be earlier than the time point at which the preparation of the mixed solution is completed.

According to the production method according to the embodiment of the present disclosure, it is possible to produce a recording medium which has an excellent image quality of an image to be recorded and excellent adhesiveness of the image and in which transfer of a component is suppressed.

The reason why such effects are exhibited is assumed as follows. However, the production method according to the embodiment of the present disclosure is not limited to the following reason.

The mixed solution used for the production method according to the embodiment of the present disclosure includes a specific aggregating agent that is a component in the liquid A and a resin that is a component in the liquid B.

The specific aggregating agent is a component that contributes to improving the image quality of an image, and the resin is a component that contributes to the adhesiveness of the image.

The mixed solution is prepared by mixing the liquid A including the specific aggregating agent and water with the liquid B including the resin and water.

However, according to the examination conducted by the present inventors, it was found that in a case where a recording medium is produced by mixing the liquid A including the specific aggregating agent and water with the liquid B including the resin and water to prepare a mixed solution and applying the obtained mixed solution onto an impermeable base material, the component on a side of the front surface of the recording medium may be transferred to an object that comes into contact with the side of the front surface thereof in a case where the time (hereinafter, also referred to as the "time taken from the start of the mixing to the start of the application of the mixed solution") taken from the start of mixing the liquid A with the liquid B to the start of application of the mixed solution onto the impermeable base material exceeds 30 days. Here, the "object that comes into contact with the side of the front surface" includes a recording medium that comes into contact with the side of the front surface of the recording medium in a roll around which the recording medium is wound. The component to be transferred is considered to be mainly the specific aggregating agent.

It is considered that the component is transferred because the dispersed state of the resin in the mixed solution is broken, and thus the film forming properties of the mixed solution are impaired and the specific aggregating agent is unlikely to be bound to the impermeable base material. Further, it is considered that the component is transferred because in a case where the resin is a polyester resin or a polyurethane resin, the resin in the mixed solution is hydrolyzed, and thus the film forming properties of the mixed solution are impaired and the specific aggregating agent is unlikely to be bound to the impermeable base material.

In order to suppress the transfer of the component described above, in the production method according to the embodiment of the present disclosure, the mixed solution after storage is applied onto the impermeable base material in 30 days from the start of mixing the liquid A with the liquid B. That is, the time from the start of the mixing to the start of the application of the mixed solution is restricted to 30 days or shorter. In this manner, the transfer of the component is suppressed. The reason why such effects are exhibited is because in a case where the dispersed state of the resin in the mixed solution is maintained or the resin is a polyester resin or a polyurethane resin, hydrolysis of the resin is suppressed, and thus the film forming property of the mixed solution are maintained.

That is, in the production method according to the embodiment of the present disclosure, it is considered that in a case where the time taken from the start of the mixing to the application of the mixed solution restricted to 30 days or shorter, the resin in the mixed solution allows the specific aggregating agent and the impermeable base material to be bound to each other, a function of binding specific aggregating agents (that is, a function of a binder) is exhibited, and thus the transfer of the component such as the specific aggregating agent is suppressed.

Hereinafter, each step of the production method according to the embodiment of the present disclosure will be described.

<Step of Preparing Liquid A>

The step of preparing the liquid A is a step of preparing the liquid A including a specific aggregating agent (that is, at least one selected from the group consisting of an acid, a polyvalent metal compound, and a metal complex) and water.

The step of preparing the liquid A may be a step of simply preparing the liquid A that has been prepared in advance or a step of preparing the liquid A.

(Specific Aggregating Agent)

The liquid A includes a specific aggregating agent (that is, at least one selected from the group consisting of an acid, a polyvalent metal compound, and a metal complex).

The specific aggregating agent exerts a function of aggregating components in an ink in a case where the ink containing a colorant and water is applied to the recording medium. In this manner, the image quality of an image to be recorded using an ink is improved.

The content of the specific aggregating agent is preferably in a range of 4% by mass to 50% by mass, more preferably in a range of 4% by mass to 40% by mass, still more preferably in a range of 4% by mass to 30% by mass, and particularly preferably in a range of 10% by mass to 30% by mass with respect to the total amount of the liquid A.

—Acid—

The acid may be an inorganic acid (such as nitric acid or thiocyanic acid) or an organic acid.

From the viewpoint of further improving the image quality of an image, it is preferable that the acid is an organic acid.

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the liquid A and the mixed solution.

Preferred examples of the organic compound containing a carboxy group include polyacrylic acid, acetic acid, formic acid, benzoic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrrone carboxylic acid, pyrrole carboxylic acid, furan carboxylic acid, pyridine carboxylic acid, coumarinic acid, thiophene carboxylic acid, and nicotinic acid. These compounds may be used alone or in combination of two or more kinds thereof.

From the viewpoint of the aggregation rate of the ink, as the organic compound containing a carboxy group, di- or higher valent carboxylic acid (hereinafter, also referred to as polyvalent carboxylic acid) is preferable, and dicarboxylic acid or tricarboxylic acid is more preferable.

As the polyvalent carboxylic acid, malonic acid, malic acid, maleic acid, succinic acid, glutaric acid, fumaric acid, tartaric acid, 4-methylphthalic acid, or citric acid is more preferable, and malonic acid, malic acid, tartaric acid, or citric acid is still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid is a substance which has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Polyvalent Metal Compound—

Examples of the polyvalent metal compound include alkaline earth metals of a group 2 (such as magnesium and calcium) in the periodic table, transition metals of a group 3 (such as lanthanum) in the periodic table, cations of a group 13 (such as aluminum) in the periodic table, and salts of lanthanides (such as neodymium).

Suitable examples of the salts of these metals include salts, nitrates, chlorides, and thiocyanates of the above-described organic acids.

Among these, a calcium salt or magnesium salt of an organic acid (such as formic acid, acetic acid, or a benzoate), a calcium salt or magnesium salt of nitric acid, calcium chloride, magnesium chloride, and a calcium salt or magnesium salt of thiocyanic acid are preferable.

Further, it is preferable that at least a part of the polyvalent metal compound is dissociated into polyvalent metal ions and counter ions in the liquid A.

—Metal Complex—

As the metal complex, a metal complex including at least one selected from the group consisting of zirconium, aluminum, and titanium as a metal element is preferable.

As the metal complex, a metal complex including at least one selected from the group consisting of acetate, acetyl acetonate, methyl acetoacetate, ethylacetoacetate, octylene glycolate, butoxyacetylacetonate, lactate, a lactate ammonium salt, and triethanolaminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

Examples of the metal complex include zirconium tetraacetyl acetonate (for example, "ORGATIX ZC-150", manufactured by Matsumoto Fine Chemical Co., Ltd.), zirconium monoacetyl acetonate (for example, "ORGATIX ZC-540", manufactured by Matsumoto Pharmaceutical Manufacture Co., Ltd.), zirconium bisacetyl acetonate (for example, "ORGATIX ZC-550", manufactured by Matsumoto Fine Chemical Co., Ltd.), zirconium monoethyl acetoacetate (for example, "ORGATIX ZC-560", manufactured by Matsumoto Fine Chemical Co., Ltd.), zirconium acetate (for example, "ORGATIX ZC-115", manufactured by Matsumoto Fine Chemical Co., Ltd.), titanium diisopropoxy bis(acetylacetonate) (for example, "ORGATIX TC-100", manufactured by Matsumoto Fine Chemical Co., Ltd.), titanium tetraacetyl acetonate (for example, "ORGATIX TC-401", manufactured by Matsumoto Fine Chemical Co., Ltd.), titanium dioctyloxy bis(octylene glycolate) (for example, "ORGATIX TC-200", manufactured by Matsumoto Fine Chemical Co., Ltd.), titanium diisopropoxy bis(ethylacetoacetate) (for example, "ORGATIX TC-750", manufactured by Matsumoto Fine Chemical Co., Ltd.), zirconium tetraacetyl acetonate (for example, "ORGATIX ZC-700", manufactured by Matsumoto Fine Chemical Co., Ltd.), zirconium tributoxy monoacetyl acetonate (for example, "ORGATIX ZC-540", manufactured by Matsumoto Fine Chemical Co., Ltd.), zirconium monobutoxy acetyl acetonate bis(ethylacetoacetate) (for example, "ORGATIX ZC-570", manufactured by Matsumoto Fine Chemical Co., Ltd.), zirconium dibutoxy bis(ethylacetoacetate) (for example, "ORGATIX ZC-580", manufactured by Matsumoto Fine Chemical Co., Ltd.), aluminum trisacetyl acetonate (for example, "ORGATIX AL-80", manufactured by Matsumoto Fine Chemical Co., Ltd.), titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126" (manufactured by Matsumoto Fine Chemical Co., Ltd.).

Among these, titanium lactate ammonium salt (for example, "ORGATIX TC-300", manufactured by Matsumoto Fine Chemical Co., Ltd.), titanium lactate (for example, "ORGATIX TC-310, 315", manufactured by Matsumoto Fine Chemical Co., Ltd.), titanium triethanol aminate (for example, "ORGATIX TC-400", manufactured by Matsumoto Fine Chemical Co., Ltd.), and a zirconyl chloride compound (for example, "ORGATIX ZC-126" (manufactured by Matsumoto Fine Chemical Co., Ltd.) are preferable.

From the viewpoint of further improving the image quality of an image, it is preferable that the specific aggregating agent includes an organic acid.

In a case where the specific aggregating agent includes an organic acid, the proportion of the organic acid in the entire specific aggregating agent is preferably 50% by mass or greater, more preferably 70% by mass or greater, and still more preferably 80% by mass or greater.

(Water)

The liquid A contains water.

The content of water in the liquid A is preferably 15% by mass or greater, more preferably 20% by mass or greater, still more preferably 30% by mass or greater, and even still more preferably 40% by mass or greater, and particularly preferably 50% by mass or greater with respect to the total amount of the liquid A.

The upper limit of the content of water depends on the amount of other components, but is preferably 95% by mass or less and more preferably 90% by mass or less.

(Water-Soluble Solvent)

It is preferable that the liquid A includes at least one water-soluble solvent.

In the present disclosure, the term "water-soluble" indicates a property in which a substance can be dissolved in water at a certain concentration or greater.

In the present disclosure, the term "water-soluble" indicates a property in which preferably 5 g or greater (more preferably 10 g or greater) of a substance is dissolved in 100 g of water at 25° C.

As the water-soluble solvent, known solvents can be used without particular limitation.

Examples of the water-soluble solvent include polyhydric alcohols such as glycerin, 1,2,6-hexanetriol, trimethylolpropane, alkanediol (such as ethylene glycol, propylene glycol (1,2-propanediol), 1,3-propanediol, 1,3-butanediol, 1,4-butanediol, 2-butene-1,4-diol, 2-ethyl-1,3-hexanediol, 2-methyl-2,4-pentanediol, 1,2-octanediol, 1,2-hexanediol, 1,2-pentanediol, or 4-methyl-1,2-pentanediol), and polyalkylene glycol (such as diethylene glycol, triethylene glycol, tetraethylene glycol, pentaethylene glycol, dipropylene glycol, or polyoxyethylene polyoxypropylene glycol); polyhydric alcohol ethers such as polyalkylene glycol ether (such as diethylene glycol monoalkyl ether, triethylene glycol monoalkyl ether, tripropylene glycol monoalkyl ether, or polyoxypropylene glyceryl ether); and saccharides, sugar alcohols, hyaluronic acids, alkyl alcohols having 1 to 4 carbon atoms, glycol ethers, 2-pyrrolidone, and N-methyl-2-pyrrolidone described in paragraph 0116 of JP2011-042150A.

Among these, from the viewpoint of suppressing the transfer of a component, polyhydric alcohol or polyhydric alcohol ether is preferable, and alkanediol, polyalkylene glycol, or polyalkylene glycol ether is more preferable.

The content of the water-soluble solvent in the liquid A is preferably in a range of 1% by mass to 50% by mass, more preferably in a range of 5% by mass to 40% by mass, and still more preferably in a range of 10% by mass to 30% by mass with respect to the total amount of the liquid A.

(Surfactant)

The liquid A may include at least one surfactant.

The surfactant can be used as a surface tension adjuster or an anti-foaming agent.

Examples of the surface tension adjuster or the anti-foaming agent include a non-ionic surfactant, a cationic surfactant, an anionic surfactant, and a betaine surfactant. Among these, from the viewpoint of the aggregation rate of the ink, a non-ionic surfactant or an anionic surfactant is preferable.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based surfactants (fluorinated alkyl-based surfactants) and silicone-based surfactants described in JP2003-322926A, JP2004-325707A, and JP2004-309806A.

The content of the surfactant (for example, an anti-foaming agent) in the liquid A is not particularly limited, but is preferably in a range of 0.001% by mass to 1% by mass, more preferably in a range of 0.001% by mass to 0.2% by mass, and still more preferably in a range of 0.005% by mass to 0.1% by mass with respect to the total amount of the liquid A.

(Other Components)

The liquid A may contain other components.

Examples of other components include known additives such as a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

<Step of Preparing Liquid B>

The step of preparing the liquid B is a step of preparing the liquid B including a resin and water.

The step of preparing the liquid B may be a step of simply preparing the liquid B that has been prepared in advance or a step of preparing the liquid B.

(Resin)

The liquid B includes a resin.

The liquid B may include only one resin or two or more kinds of resins.

The resin has a function of improving the adhesiveness between the image and the recording medium. Further, the resin has a function of binding the specific aggregating agent and the impermeable base material on the impermeable base material and binding the specific aggregating agents to each other (that is, a function of a binder).

Examples of the resin in the liquid B include a polyester resin, a polyurethane resin, an acrylic resin, a polyamide resin, a polyurea resin, a polycarbonate resin, a polyolefin resin, and a polystyrene resin.

From the viewpoints of suppressing the transfer of a component and improving the adhesiveness of the image, it is preferable that the resin in the liquid B includes at least one of a polyester resin or a polyurethane resin.

Further, in a case where the resin in the liquid B includes at least one of a polyester resin or a polyurethane resin and the time taken from the start of the mixing to the start of the application of the mixed solution (the time taken from the start of mixing the liquid A with the liquid B to the start of application of the mixed solution onto the impermeable base material) exceeds 30 days, the resin in the mixed solution is hydrolyzed, the film forming properties of the mixed solution are impaired, and thus transfer of the component of the recording medium is more likely to occur and the adhesiveness of the image may be degraded.

However, in the production method according to the embodiment of the present disclosure, since the time taken from the start of the mixing to the start of the application of the mixed solution is 30 days or shorter, the effects (effects of suppressing the transfer of the component and improving the adhesiveness of the image) from the polyester resin and/or the polyurethane resin are maintained.

Therefore, in a case where the resin in the liquid B includes at least one of a polyester resin or a polyurethane resin, the improvement obtained by setting the time taken from the start of the mixing to the start of the application of the mixed solution to 30 days or short is large (see the comparison of Example 4 with Comparative Example 1 (polyester resin), the comparison of Example 15 with Comparative Example 2 (polyurethane resin), and the comparison of Example 21 with Comparative Example 3 (acrylic resin) described below).

In a case where the resin in the liquid B includes at least one of a polyester resin or a polyurethane resin, the total proportion of the polyester resin and the polyurethane resin in the entire resin in the liquid B is preferably 50% by mass or greater, more preferably 70% by mass or greater, and still more preferably 80% by mass or greater.

The weight-average molecular weight (Mw) of the resin in the liquid B is preferably in a range of 1000 to 300000, more preferably in a range of 2000 to 200000, and still more preferably in a range of 5000 to 100000.

In the present disclosure, the weight-average molecular weight (Mw) indicates a value measured according to gel permeation chromatography (GPC) unless otherwise specified.

The measurement according to gel permeation chromatography (GPC) is performed using HLC (registered trademark)-8020GPC (manufactured by Tosho Corporation) as a measuring device, three columns of TSKgel (registered trademark) Super Multipore HZ-H (manufactured by Tosho Corporation, 4.6 mmID×15 cm), and tetrahydrofuran (THF) as an eluent. Further, as the measurement conditions, the measurement is performed at a sample concentration of 0.45% by mass, a flow rate of 0.35 ml/min, a sample injection volume of 10 µl, and a measurement temperature of 40° C. using an RI detector.

Further, the calibration curve is created using eight samples of "F-40", "F-20", "F-4", "F-1", "A-5000", "A-2500", "A-1000", and "n-propylbenzene" which are "Standard Samples TSK standard, polystyrene" (manufactured by Tosho Corporation).

The resin in the liquid B has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, or an adamantane ring structure is more preferable.

As the aromatic ring structure, a naphthalene ring or a benzene ring is preferable, and a benzene ring is more preferable.

The amount of the alicyclic structure or the aromatic ring structure is not particularly limited, but is preferably in a range of 0.01 mol to 1.5 mol and more preferably in a range of 0.1 mol to 1 mol per 100 g of the resin.

It is preferable that the resin in the liquid B has an ionic group in the structure.

The ionic group may be an anionic group or a cationic group, but an anionic group is preferable from the viewpoint of ease of introduction.

The anionic group is not particularly limited, but a carboxy group or a sulfo group is preferable, and a sulfo group is more preferable.

The amount of the ionic group is not particularly limited, but is preferably in a range of 0.001 mol to 1.0 mol and more preferably in a range of 0.01 mol to 0.5 mol per 100 g of the resin.

As the form of the resin in the liquid B, a particle is preferable.

That is, it is preferable that the liquid B includes particles consisting of a resin (hereinafter, also referred to as "resin particles").

In a case where the liquid B includes resin particles, it is preferable that the resin in the resin particles is a water-insoluble resin.

In the present disclosure, the term "water-insoluble" indicates a property in which the amount of a substance to be dissolved in 100 g of water at 25° C. is less than 1.0 g (more preferably less than 0.5 g).

The volume average particle diameter of the above-described resin particles is preferably in a range of 1 nm to 300 nm, more preferably in a range of 3 nm to 200 nm, and still more preferably in a range of 5 nm to 150 nm.

In the present disclosure, the volume average particle diameter indicates a value measured using a laser diffraction scattering particle size distribution analyzer.

As a measuring device, a particle size distribution measuring device "MICROTRAC MT-3300II" (manufactured by Nikkiso Co., Ltd.) is exemplified.

Specific examples of the resin particles include PESRESIN A124GP and PESRESIN A645GH (both manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), and EM57DOC (manufactured by Daicel FineChem Ltd.).

As the resin in the liquid B, a water-insoluble resin (for example, the above-described resin particles) and a water-soluble resin may be used in combination.

The water-soluble resin is not particularly limited, and known water-soluble resins such as polyvinyl alcohol, polyacrylamide, polyvinylpyrrolidone, and polyethylene glycol can be used.

Further, as the water-soluble resin, water-soluble polymer compounds described in paragraphs 0026 to 0080 of JP2013-001854A are also suitable.

The content of the resin in the liquid B is preferably in a range of 5% by mass to 50% by mass, more preferably in a range of 5% by mass to 45% by mass, and still more preferably in a range of 10% by mass to 30% by mass with respect to the total amount of the liquid B.

(Water)

The liquid B contains water.

The content of water in the liquid B is preferably 15% by mass or greater, more preferably 20% by mass or greater, still more preferably 30% by mass or greater, even still more preferably 40% by mass or greater, and particularly preferably 50% by mass or greater with respect to the total amount of the liquid B.

The upper limit of the content of water depends on the amount of other components, but is preferably 95% by mass or less and more preferably 90% by mass or less.

(Other Components)

The liquid B may contain other components.

Examples of other components include known additives such as a water-soluble solvent, a solid wetting agent, colloidal silica, an inorganic salt, a fading inhibitor, an emulsion stabilizer, a penetration enhancer, an ultraviolet absorbing agent, a preservative, an antibacterial agent, a pH adjuster, a viscosity adjuster, a rust inhibitor, and a chelating agent.

The preferable aspect of the water-soluble solvent that can be contained in the liquid B is the same as the preferable aspect of the water-soluble solvent that can be contained in the liquid A.

<Step of Obtaining Mixed Solution>

The step of obtaining a mixed solution is a step of mixing the liquid A with the liquid B at an ambient temperature of 5° C. to 40° C. to obtain a mixed solution.

The mixed solution obtained in the step of obtaining the mixed solution is stored at an ambient temperature of 5° C. to 40° C. in the step of storing the mixed solution described below and then applied onto the impermeable base material in 30 days from the start of mixing the liquid A with the liquid B in the step of obtaining a recording medium described below.

Here, the meaning of the time point of "the start of mixing the liquid A with the liquid B" is as described above.

In the step of obtaining the mixed solution, the aspect (for example, the supply order) of supplying the liquid A and the liquid B into the container used for mixing the liquid A with the liquid B is not particularly limited.

Examples of the aspect of supplying the liquid A and the liquid B into the container include an aspect in which all the required amount of liquid A is supplied and then all the required amount of liquid B is supplied into the container; an aspect in which all the required amount of liquid B is supplied and then all the required amount of liquid A is supplied into the container; an aspect in which some of the required amount of liquid A is supplied, all the required amount of liquid B is supplied, and then the remaining liquid A is supplied into the container; an aspect in which some of the required amount of liquid B is supplied, all the required amount of liquid A is supplied, and then the remaining liquid B is supplied into the container; an aspect in which some of the required amount of liquid A is supplied, some of the required amount of liquid B is supplied, the remaining liquid A is supplied, and then the remaining liquid B is supplied into the container; and an aspect in which some of the required amount of liquid B is supplied, some of the required amount of liquid A is supplied, the remaining liquid B is supplied, and then the remaining liquid A is supplied into the container.

Further, as the aspect of supplying the liquid A and the liquid B into the container, an aspect in which a required amount of liquid A and/or a required amount of liquid B are supplied in three or more times may be exemplified.

As the aspect of supplying the liquid A and the liquid B into the container, an aspect in which all the required amount of liquid B is supplied and then all the required amount of liquid A is supplied into the container is preferable. In a case of this aspect, it is preferable to slowly supply all the required amount of liquid A little by little.

In a case of the above-described preferable aspect, damage to the resin in the liquid B can be further reduced.

Examples of the method of mixing the liquid A with the liquid B include a method of allowing the container, into which the liquid A and the liquid B have been supplied, to stand, a method of shaking the container into which the liquid A and the liquid B have been supplied, a method of stirring the liquid A and the liquid B in the container into which the liquid A and the liquid B have been supplied, and a method of combining two or more of these methods.

The shaking of the container and/or the stirring of the liquid in the container may be started after the supply of all the required amounts of the liquid A and the liquid B is completed or before this time point.

In addition, even in a case where the shaking of the container and/or the stirring of the liquid in the container is started before the supply of all the required amounts of the liquid A and the liquid B is completed, the time point of "the start of mixing the liquid A with the liquid B" in the present disclosure is the time point of the supply of all the required amounts of the liquid A and the liquid B is completed.

The ambient temperature in a case of mixing the liquid A with the liquid B is in a range of 5° C. to 40° C. and preferably in a range of 10° C. to 30° C.

The liquid temperatures of the liquid A and the liquid B in the case of mixing the liquid A with the liquid B are not particularly limited, but are respectively preferably in a range of 5° C. to 40° C. and more preferably in a range of 10° C. to 30° C.

The atmosphere in the case of mixing the liquid A with the liquid B is not particularly limited and may be an air atmosphere or an atmosphere other than the air atmosphere (for example, an inert gas atmosphere).

The humidity of the atmosphere in the case of mixing the liquid A with the liquid B is not particularly limited.

The humidity thereof is preferably in a range of 10% to 90%, more preferably in a range of 20% to 80%, and still more preferably in a range of 30% to 70%.

In the present disclosure, the humidity indicates the relative humidity.

In the step of obtaining the mixed solution, the mixing volume ratio of the liquid A to the liquid B (hereinafter, also referred to as the mixing volume ratio [liquid A/liquid B]) is not particularly limited, but is preferably in a range of 0.3 to 4.0 from the viewpoint of further suppressing the transfer of a component.

The reason why the transfer of a component is further suppressed in a case where the mixing volume ratio [liquid A/liquid B] is 0.3 or greater is not clear, but the reason is considered that the dispersibility of the resin is improved because the amount of the resin to the amount of the specific aggregating agent is reduced to some extent.

The reason why the transfer of a component is further suppressed in a case where the mixing volume ratio [liquid A/liquid B] is 4.0 or less is not clear, but the reason is considered that the damage to the resin due to the specific aggregating agent can be suppressed because the amount of the specific aggregating agent to the amount of the resin is reduced to some extent.

The mixing volume ratio [liquid A/liquid B] is more preferably in a range of 0.3 to 3.0, still more preferably in a range of 0.5 to 3.0, and still more preferably in a range of 0.5 to 2.5.

It goes without saying that the mixing volume ratio [liquid A/liquid B] is a volume ratio of a required amount of the liquid A for obtaining an intended amount of the mixed solution to a required amount of the liquid B for obtaining an intended amount of the mixed solution.

<Step of Storing Mixed Solution>

The step of storing the mixed solution is a step of storing the mixed solution obtained in the step of obtaining the mixed solution at an ambient temperature of 5° C. to 40° C.

In the present disclosure, "storing the mixed solution at an ambient temperature of 5° C. to 40° C." indicates that the mixed solution is allowed to be present at an ambient temperature of 5° C. to 40° C. and is not particularly limited.

The place where the mixed solution is stored is not particularly limited. The mixed solution may be stored inside the recording medium production device for producing a recording medium or outside the recording medium production device (that is, in a container independent from the recording medium production device).

The time for storing the mixed solution is appropriately adjusted according to the time taken from the start of mixing the liquid A with the liquid B to the start of application of the mixed solution onto the impermeable base material.

The ambient temperature in the step of storing the mixed solution is preferably in a range of 10° C. to 30° C.

The liquid temperature of the mixed solution in the step of storing the mixed solution is preferably in a range of 5° C. to 40° C. and more preferably in a range of 10° C. to 30° C.

The atmosphere for storing the mixed solution is not particularly limited and may be an air atmosphere or an atmosphere other than the air atmosphere (for example, an inert gas atmosphere).

The humidity of the atmosphere for storing the mixed solution is not particularly limited.

The humidity (that is, the relative humidity) is preferably in a range of 10% to 90%, more preferably in a range of 20% to 80%, and still more preferably in a range of 30% to 70%.

The storage of the mixed solution may be performed in an open system or in a closed system.

As the open system, a state in which the internal space of a container accommodating the mixed solution communicates with the space outside the container is exemplified.

As the closed system, a state in which the internal space of a container accommodating the mixed solution does not communicate with the space outside the container is exemplified.

<Step of Obtaining Recording Medium>

The step of obtaining the recording medium is a step of applying the mixed solution after storage in the step of storing the mixed solution is applied onto the impermeable base material in 30 days from the start of mixing the liquid A with the liquid B to obtain a recording medium.

In the present disclosure, the "impermeable base material" indicates a base material that absorbs a small amount of water or does not absorb water and specifically indicates a base material in which the water absorption amount is 0.3 g/m$^2$ or less.

The water absorption amount (g/m$^2$) of the base material is measured as follows.

Water is brought into contact with a region having an area of 100 mm×100 mm on the front surface of the base material (that is, the surface to which the mixed solution is applied), and the state is maintained at 25° C. for 1 minute. The mass (absorption amount (g)) of water absorbed by maintaining the state for 1 minute is acquired, and the obtained absorption amount (g) is converted into the absorption amount per unit area (g/m$^2$).

The impermeable base material is not particularly limited, but a resin base material is preferable.

The resin base material is not particularly limited, and examples thereof include a base material consisting of a thermoplastic resin.

A base material obtained by molding a thermoplastic resin in the form of a sheet is exemplified as the resin base material.

It is preferable that the resin base material includes polypropylene, polyethylene terephthalate, nylon, polyethylene, or polyimide.

The resin base material may be a transparent resin base material or a colored resin base material, and at least a part thereof may be subjected to a metal vapor deposition treatment or the like.

The shape of the resin base material is not particularly limited, but a sheet-like resin base material is preferable. From the viewpoint of the productivity of the recording medium, a sheet-like resin base material which is capable of forming a roll by being wound is more preferable.

The thickness of the resin base material is preferably in a range of 10 μm to 200 μm and more preferably in a range of 10 μm to 100 μm.

The resin base material may have been subjected to a surface treatment.

Examples of the surface treatment include a corona treatment, a plasma treatment, a flame treatment, a heat treatment, an abrasion treatment, and a light irradiation treatment (UV treatment), but the present invention is not limited thereto. For example, in a case where a corona treatment is performed on the surface of the resin base material before the ink is applied to record an image, the surface energy of the resin base material increases, and wetting of the surface of the resin base material and adhesion of the ink to the resin base material are promoted. The corona treatment can be performed using Corona Master (manufactured by Shinko Electric & Instrumentation Co., Ltd., PS-10S) or the like. The conditions for the corona treatment may be appropriately selected depending on the kind of the resin base material, the composition of the ink, and the like. For example, the following treatment conditions may be employed.

Treatment voltage: 10 to 15.6 kV

Treatment speed: 30 to 100 mm/s

The ambient temperature at the time at which the application of the mixed solution onto the impermeable base material is started is preferably in a range of 5° C. to 40° C. and more preferably in a range of 10° C. to 30° C.

The atmosphere at the time at which the application of the mixed solution onto the impermeable base material is started is not particularly limited and may be an air atmosphere or an atmosphere other than the air atmosphere (for example, an inert gas atmosphere).

The humidity of the atmosphere at the time at which the application of the mixed solution onto the impermeable base material is started is not particularly limited, but the humidity (that is, the relative humidity) is preferably in a range of 10% to 90%, more preferably in a range of 20% to 80%, and still more preferably in a range of 30% to 70%.

In the production method according to the embodiment of the present disclosure, it is preferable that the mixed solution after storage is applied onto the impermeable base material in 30 days after 10 minutes from the start of mixing the liquid A with the liquid B (that is, the start of application of the mixed solution onto the impermeable base material). In this manner, the transfer of the component of the recording medium is further suppressed. Although the reason is not clear, in a case where the application of the mixed solution onto the impermeable base material is started after 10 minutes from the start of mixing the liquid A with the liquid B, the transfer of the component is considered to be suppressed because the component derived from the liquid A and the component derived from the liquid B can be made more compatible with each other in the mixed solution until the mixed solution is applied onto the impermeable base material.

In the production method according to the embodiment of the present disclosure, it is more preferable that the mixed solution after storage is applied onto the impermeable base material in 30 days after 30 minutes from the start of mixing the liquid A with the liquid B (that is, the application of the mixed solution onto the impermeable base material is started), it is more preferable that the mixed solution after storage is applied onto the impermeable base material in 20 days after 30 minutes from the start of mixing the liquid A with the liquid B (that is, the application of the mixed solution onto the impermeable base material is started), and it is more preferable that the mixed solution after storage is applied onto the impermeable base material in 10 days after 30 minutes from the start of mixing the liquid A with the liquid B (that is, the application of the mixed solution onto the impermeable base material is started).

The application of the mixed solution onto the impermeable base material can be performed by employing a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reverse roll coater, a gravure coater, and a flexo coater.

The details of the ink jet method are the same as the details of the ink jet method in a step of recording an image described below.

The mass (g/m²) of the mixed solution to be applied per unit area is not particularly limited as long as components in the ink can be aggregated, but is preferably in a range of 0.1 g/m² to 10 g/m², more preferably in a range of 0.5 g/m² to 6.0 g/m², and still more preferably in a range of 1.0 g/m² to 4.0 g/m².

Further, in the step of obtaining the recording medium, the impermeable base material may be heated before the application of the mixed solution.

The heating temperature may be appropriately set depending on the kind of the impermeable base material and the composition of the mixed solution, but the temperature of the impermeable base material is set to be preferably in a range of 20° C. to 50° C. and more preferably in a range of 25° C. to 40° C.

In the step of obtaining the recording medium, it is preferable that the recording medium is obtained by applying the mixed solution onto the impermeable base material and drying the mixed solution.

As an aspect of the drying, drying by heating is preferable.

Examples of the means for performing drying by heating include known heating means such as a heater, known air blowing means such as a dryer, and means for combining these.

Examples of the method for performing drying by heating include a method of applying heat with a heater or the like from a side opposite to the surface of the impermeable base material to which the mixed solution has been applied, a method of applying warm air or hot air to the surface of the impermeable base material to which the mixed solution has been applied, a method of applying heat with an infrared heater from the surface of the impermeable base material to which the mixed solution has been applied or from a side opposite to the surface of the impermeable base material to which the mixed solution has been applied, and a method of combining a plurality of these methods.

The heating temperature in a case of performing drying by heating is preferably 35° C. or higher and more preferably 40° C. or higher.

The upper limit of the heating temperature is not particularly limited, and the upper limit thereof may be 100° C. and is preferably 90° C. and more preferably 70° C.

Here, the heating temperature indicates the temperature of the surface of the impermeable base material to which the mixed solution has been applied.

The time for drying by heating is not particularly limited, but is preferably in a range of 0.5 seconds to 60 seconds, more preferably in a range of 0.5 seconds to 20 seconds, and particularly preferably in a range of 0.5 seconds to 10 seconds.

In the production method according to the embodiment of the present disclosure, in a case where the weight-average molecular weight of the resin in the liquid B after the step of preparing the liquid B and before the step of obtaining the mixed solution is set as Mw1 and the weight-average molecular weight of the resin in the mixed solution immediately before the application of the mixed solution onto the impermeable base material is set as Mw2, Mw2/Mw1 is preferably in a range of 0.70 to 1.00.

Here, "immediately before the application of the mixed solution onto the impermeable base material" indicates a time period after one minute earlier than the time point (hereinafter, referred to as "T1") of the start of the application of the mixed solution onto the impermeable base material and before T1.

Mw1 is measured by collecting a sample liquid from the liquid B at the time point after the step of preparing the liquid B and before the step of obtaining the mixed solution and using the collected sample liquid. The measurement of Mw1 is completed in 60 minutes from the time point at which the sample liquid is collected.

Mw2 is measured by collecting a sample liquid from the mixed solution immediately before the application of the mixed solution onto the impermeable base material and using the collected sample liquid. The measurement of Mw2 is completed in 60 minutes from the time point at which the sample liquid is collected.

Here, in a case where the mixed solution includes an acid as an aggregating agent, the measurement of Mw2 is performed by neutralizing the acid in the sample liquid collected from the mixed solution and using the sample liquid after the neutralization is completed. Even in this case, the measurement of Mw2 is completed in 60 minutes from the time point at which the sample liquid is collected. Further, in this case, the neutralization of the acid in the sample liquid is completed in 3 minutes from the time point at which the sample liquid is collected. Here, the neutralization of the acid in the sample liquid is performed by adding a base to the sample liquid while the pH of the sample liquid is confirmed using a pH meter, and the time point at which the pH of the sample liquid reaches 7.0 is set as the time point at which the neutralization is completed.

All or some steps of the production method according to the embodiment of the present disclosure may be performed using a device or may be performed manually.

<Liquid Mixing Device and Recording Medium Production Device>

Examples of a device for performing all or some steps of the production method according to the embodiment of the present disclosure include a liquid mixing device for performing a step of obtaining a mixed solution and a recording medium production device for performing a step of obtaining a recording medium.

The liquid mixing device is not particularly limited as long as the device mixes a plurality of liquids.

It is preferable that the liquid mixing device comprises a storage unit A that stores the liquid A, a storage unit B that stores the liquid B, and a mixing unit that mixes the liquid A supplied from the storage unit A with the liquid B supplied from the storage unit B.

It is preferable that the recording medium production device comprises a mixed solution applying unit and a mixed solution drying unit.

The recording medium production device may or may not comprise a liquid mixing device.

In a case where the recording medium production device does not comprise a liquid mixing device, the mixed solution prepared outside the recording medium production device is supplied to the mixed solution applying unit of the recording medium production device.

The structure of the recording medium production device comprising a liquid mixing device and the structure of the liquid mixing device can refer to known techniques such as the structure of an ink jet device described in JP2013-043364A (for example, paragraphs 0019 to 0050).

The recording medium production device may be a device having an image recording function.

As the recording medium production device having an image recording function, a device which has a transport mechanism for transporting the impermeable base material and comprises a mixed solution applying unit, a mixed solution drying unit, an ink applying unit, and an ink drying unit in this order as viewed from the upstream side of the impermeable base material in the transport direction is preferable.

According to the recording medium production device of this aspect, the production of the recording medium and recording of an image on the produced recording medium can be continuously performed.

A specific example of the recording medium production device having an image recording function will be described below (see FIG. 1).

[Image Recording Method]

An image recording method according to the embodiment of the present disclosure includes a step of producing a recording medium using the above-described method of producing a recording medium according to the embodiment of the present disclosure, and a step of applying an ink which includes a colorant and water onto the produced recording medium and recording an image.

Since the image recording method according to the embodiment of the present disclosure includes the above-described method of producing a recording medium according to the embodiment of the present disclosure, according to the image recording method according to the embodiment of the present disclosure, an image with an excellent image quality and excellent adhesiveness can be recorded, and transfer of the component of the recording medium can be suppressed.

The preferable aspect of the step of producing the recording medium is the same as the preferable aspect of the method of producing a recording medium according to the embodiment of the present disclosure.

The step of recording an image is a step of applying an ink that includes a colorant and water onto the recording medium produced in the step of producing a recording medium and recording an image.

In the step of recording an image, the ink may be applied to the entire region of the recording medium to which the mixed solution has been applied to record an image on the entire region or the ink may be applied to a part of a region of the recording medium to which the mixed solution has been applied to record an image on the part of the region. In a case where an image is recorded on the part of the region, an image and an image non-recording region (that is, a region where the ink has not been applied) are formed on the region of the recording medium to which the mixed solution has been applied.

In the step of recording an image, an image may be recorded by applying only one kind of ink onto the recording medium or an image may be recorded by applying two or more kinds of inks thereonto. In a case where two or more colors of inks are applied in the step of recording an image, an image with two or more colors can be recorded.

Known methods such as a coating method, an ink jet method, and an immersion method can be applied as the method of applying the ink in the step of recording an image.

Among them, the ink jet method is preferable.

A method of jetting an ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of jetting an ink using a radiation pressure by changing an electric signal into an acoustic beam and radiating the acoustic beam to the ink; and a thermal ink jet (bubble jet (registered trademark)) method of heating an ink to form bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

As the ink jet method, the method described in paragraphs 0093 to 0105 of JP2003-306623A can be employed.

The application of the ink according to the ink jet method is performed by allowing a nozzle of an ink jet head to jet the ink.

Examples of the system of the ink jet head include a shuttle system of performing recording while scanning a short serial head in the width direction of the impermeable base material and a line system of using a line head in which recording elements are aligned in correspondence with the entire region of one side of the impermeable base material.

In the line system, an image can be recorded on the entire surface of the impermeable base material by scanning the impermeable base material in a direction intersecting the alignment direction of the recording elements. In the line system, a transport system such as a carriage that scans a short head in the shuttle system is not necessary. Further, in the line system, as compared with the shuttle system, the control of complicated scanning of the impermeable base material and the movement of the carriage is not required, and only the impermeable base material moves. Therefore, according to the line system, image recording at a higher speed can be realized as compared with the shuttle system.

From the viewpoint of obtaining a high-definition image, the liquid droplet amount of ink jetted from the nozzle of the ink jet head is preferably in a range of 1 pL (pico liter) to 10 pL and more preferably in a range of 1.5 pL to 6 pL.

In addition, from the viewpoints of improving the image irregularity and improving connection of continuous gradations, it is also effective that the ink is jetted by combining different amounts of liquid droplets.

The application of the ink in the step of recording an image is started preferably in 65 days from the time point at which the application of the mixed solution onto the impermeable base material in the step of producing the recording medium is completed, more preferably in 60 days from the above-described time point, and still more preferably in 30 days from the above-described time point.

In a case where the application of the ink is started in 65 days from the above-described time point, the image quality and adhesiveness of the image can be further improved. The reason is considered that in a case where the application of the ink is started in 65 days from the above-described time point, the function of improving the image quality of the image due to the specific aggregating agent and the function of improving the adhesiveness of the image due to the resin are more effectively exerted.

The lower limit of the time from the time point at which the application of the mixed solution onto the impermeable base material is completed to the start of the application of the ink is not particularly limited, but is preferably 1 second and more preferably 3 seconds.

In the step of recording an image, it is preferable that the image is recorded by applying the ink onto the recording medium and heating and drying the applied ink.

Examples of the means for performing drying by heating include known heating means such as a heater, known air blowing means such as a dryer, and means for combining these.

Examples of the method of heating and drying the ink include a method of applying heat with a heater or the like from a side opposite to the surface of the recording medium to which the ink has been applied, a method of applying warm air or hot air to the surface of the recording medium to which the ink has been applied, a method of applying heat with an infrared heater from the surface of the recording medium to which the ink has been applied or from a side opposite to the surface of the recording medium to which the mixed solution has been applied, and a method of combining a plurality of these methods.

The heating temperature of in a case of heating and drying the ink is preferably 55° C. or higher, more preferably 60° C. or higher, and particularly preferably 65° C. or higher.

The upper limit of the heating temperature is not particularly limited, and the upper limit thereof may be 100° C. and preferably 90° C.

The time for heating and drying the ink is not particularly limited, but is preferably in a range of 3 seconds to 60 seconds, more preferably in a range of 5 seconds to 60 seconds, and particularly preferably in a range of 10 seconds to 45 seconds.

In the step of recording an image, the recording medium may be heated before the application of the ink.

The heating temperature may be appropriately set depending on the kind of the impermeable base material in the recording medium and the composition of the ink, but the temperature of the impermeable base material in the recording medium is set to be preferably in a range of 20° C. to 50° C. and more preferably in a range of 25° C. to 40° C.

In a case where the mixed solution is heated and dried in the step of producing a non-recording medium, the heating for heating and drying the mixed solution may also serve as the heating of the recording medium before the application of the ink.

<Ink>

The ink in the step of recording an image includes a colorant and water.

The ink is not particularly limited except that the ink includes a colorant and water.

The ink may be any color ink.

Examples of the ink include black ink (that is, black color ink), cyan ink (that is, cyan color ink), magenta ink (that is, magenta color ink), yellow ink (that is, yellow color ink), white ink (that is, white color ink), orange ink (that is, orange color ink), green ink (that is, green color ink), purple ink (that is, purple color ink), light cyan ink (that is, light cyan color ink), and light magenta ink (that is, light magenta color ink).

The color of the ink is adjusted according to the kind of colorant in the ink.

(Colorant)

The ink contains at least one colorant.

The colorant is not particularly limited and a known colorant can be used, but an organic pigment or an inorganic pigment is preferable.

Examples of the organic pigment include an azo pigment, a polycyclic pigment, a chelate dye, a nitro pigment, a nitroso pigment, and aniline black. Among these, an azo pigment and a polycyclic pigment are more preferable.

Examples of the inorganic pigment include titanium oxide, iron oxide, calcium carbonate, barium sulfate, aluminum hydroxide, yellow barium, cadmium red, chrome yellow, and carbon black. Among these, carbon black is particularly preferable.

Preferred examples of the colorant include the colorants described in paragraphs 0096 to 0100 of JP2009-241586A.

The content of the colorant is preferably in a range of 1% by mass to 25% by mass, more preferably in a range of 2% by mass to 20% by mass, and particularly preferably in a range of 2% by mass to 15% by mass with respect to the total amount of the ink.

(Dispersant)

The ink may contain a dispersant for dispersing the colorant. As the dispersant, any of a polymer dispersant or a low-molecular-weight surfactant-type dispersant may be used. Further, as the polymer dispersant, any of a water-soluble dispersant or a water-insoluble dispersant may be used.

Preferred examples of the dispersant include dispersants described in paragraphs 0080 to 0096 of JP2016-145312A.

The mixing mass ratio between a colorant (P) and a dispersant (s) (p:s) is preferably in a range of 1:0.06 to 1:3, more preferably in a range of 1:0.125 to 1:2, and still more preferably in a range of 1:0.125 to 1:1.5.

(Water)

The ink contains water.

The content of water is preferably in a range of 50% by mass to 90% by mass and more preferably in a range of 60% by mass to 80% by mass with respect to the total amount of the ink.

(Resin Particles)

The ink may contain at least one kind of resin particles.

In a case where the ink contains resin particles, the fixing property of mainly the ink to the recording medium and the rub resistance can be further improved. Further, the resin particles that can be contained in the ink have a function of causing aggregation or dispersion instability in a case where the resin particles are brought into contact with the specific aggregating agent on the recording medium to thicken the ink and fixing the ink (that is, the image) to the recording medium. It is preferable that such resin particles are dispersed in water and a water-containing organic solvent.

Preferred examples of the resin particles include the resin particles (for example, self-dispersing polymer particles) described in paragraphs 0062 to 0076 of JP2016-188345A.

From the viewpoint of the rub resistance of an image to be obtained, it is preferable that the Tg of the resin particles included in the ink is higher than the Tg of the resin in the liquid B.

(Water-Soluble Solvent)

It is preferable that the ink contains at least one water-soluble solvent.

In this manner, the effect of suppressing the drying of the ink or the effect of wetting the ink can be obtained.

The water-soluble solvent that can be contained in the ink can be used as an anti-drying agent that prevents clogging of aggregates formed due to the ink dried and adhering to an ink jet port of an ejection nozzle.

From the viewpoints of suppressing drying and wetting, it is preferable that the water-soluble solvent contained in the ink is a water-soluble solvent having a lower vapor pressure than that of water.

In addition, the boiling point of the water-soluble solvent at 1 atm (1013.25 hPa) is preferably in a range of 80° C. to 300° C. and more preferably in a range of 120° C. to 250° C.

As the anti-drying agent, a water-soluble solvent having a lower vapor pressure than that of water is preferable.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof. The content of the anti-drying agent is preferably in a range of 10% to 50% by mass with respect to the total amount of the ink.

The water-soluble solvent may be used for adjusting the viscosity of the ink in addition to the description above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (such as ethanolamine, diethanolamine, triethanolamine, N-methyl di ethanol amine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

In this case, the water-soluble solvent may also be used alone or in combination of two or more kinds thereof.

(Other Additives)

The ink may contain components other than the above-described components.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an anti-foaming agent, a viscosity adjuster, a dispersant, a dispersion stabilizer, a rust inhibitor, and a chelating agent.

[One Example of Recording Medium Production Device Having Image Recording Function]

Hereinafter, an example of the recording medium production device having an image recording function, which can be suitably used for the image recording method according to the embodiment of the present disclosure, will be described with reference to FIG. 1.

FIG. 1 is a view conceptually illustrating an example of the recording medium production device having an image recording function.

As illustrated in FIG. 1, the recording medium production device according to the present example is a device which unwinds a long impermeable base material S1 wound in a roll shape by an unwinding device W1, transports the unwound impermeable base material S1 in the direction indicated by the block arrow, and allows the impermeable base material to pass through a mixed solution applying device A1, a mixed solution drying zone Dry1, an ink jet ink applying device IJ1, and an ink drying zone Dry2 in this order, and finally winds the impermeable base material using a winding device W2.

In addition, since FIG. 1 is a conceptual view, the view is illustrated such that the impermeable base material S1 is transported in one direction by simplifying the transport path of the impermeable base material S1. Practically, it goes without saying that the transport path of the impermeable base material S1 may meander. The method of transporting the impermeable base material S1 can be appropriately selected from various web transport methods of using a drum, a roller, and the like.

The above-described step of producing the recording medium (that is, the method of producing the recording medium) is performed by the mixed solution applying device A1 and the mixed solution drying zone Dry1. The mixed solution drying zone Dry1 may be omitted.

The method and the conditions exemplified in the section of "method of producing recording medium" can be employed as the method and the conditions for applying the mixed solution in the mixed solution applying device A1.

The method and the conditions exemplified in the section of "method of producing recording medium" can be employed as the method and the conditions for drying the mixed solution in the mixed solution drying zone Dry1.

Further, a surface treatment unit (not illustrated) for performing a surface treatment (preferably, a corona treatment) on the impermeable base material S1 may be provided on the upstream side of the impermeable base material S1 in the transport direction with respect to the mixed solution applying device A1.

Further, the recording medium production device according to the present example may further comprise a liquid mixing device (not illustrated) that is used to mix the liquid A with the liquid B and is connected to the mixed solution applying device A1.

The liquid mixing device comprises a storage unit A that stores the liquid A, a storage unit B that stores the liquid B, and a mixing unit that mixes the liquid A supplied from the storage unit A with the liquid B supplied from the storage unit B. In this case, the mixing unit of the liquid mixing device is connected to the mixed solution applying device A1.

Further, the recording medium production device according to the present example may not comprise the liquid mixing device.

In this case, the liquid A and the liquid B are mixed manually by using a liquid mixing device different from the recording medium production device and without using a special liquid mixing device.

The step of recording the above-described image is performed by the ink applying device IJ1 and the ink drying zone Dry2. The ink drying zone Dry2 may be omitted.

The method and the conditions exemplified in the section of the step of recording an image can be employed as the method and the conditions for applying the mixed solution in the ink applying device IJ1.

The method and the conditions exemplified in the section of the step of recording an image can be employed as the method and the conditions for drying the mixed solution in the ink drying zone Dry2.

Although not illustrated, the structure of the ink applying device IJ1 may be a structure comprising at least one ink jet head.

The ink jet head may be a shuttle head, but a line head in which a large number of jet ports (nozzles) are aligned in the width direction of a long impermeable base material is preferable as the ink jet head from the viewpoint of increasing the speed of image recording.

From the viewpoint of increasing the speed of image recording, it is preferable that the structure of the ink applying device IJ1 is a structure comprising at least one of a line head for black (K) ink, a line head for cyan (C) ink, a line head for magenta (M) ink, or a line head for yellow (Y) ink.

As the structure of the ink applying device IJ1, a structure which comprises at least two of the above-described four line heads and in which two or more of these line heads are aligned in the transport direction of the impermeable base material (the direction indicated by the block arrow) is more preferable.

The ink applying device IJ1 may further comprise at least one of a line head for white ink, a line head for orange ink, a line head for green ink, a line head for purple ink, a line head for light cyan ink, or a line head for light magenta ink.

In the recording medium production device according to the present example, an image can be recorded by performing a step (that is, the method of producing a recording medium) of unwinding the long impermeable base material S1 wound in a roll shape using the unwinding device W1 and transporting the unwound impermeable base material S1 in the direction indicated by the block arrow to produce the above-described recording medium using the mixed solution applying device A1 and the mixed solution drying zone Dry1 and applying the ink onto the obtained recording medium (that is, the impermeable base material S1 after passing through the mixed solution drying zone Dry1 in FIG. 1) and drying the ink using the ink jet ink applying device IJ1 and the ink drying zone Dry 2. The recording medium on which an image has been recorded is wound by the winding device W2 (hereinafter, the above-described image recording mode is will be referred to as a "mode X").

In the image recording in this mode X, the time taken from the application of the mixed solution onto the impermeable base material to the application of the ink can be adjusted by adjusting the transport speed of the impermeable base material.

The time taken from the application of the mixed solution onto the impermeable base material to the application of the ink can be adjusted by image recording in the following mode Y.

According to the image recording in the mode Y, the recording medium is produced by the mixed solution applying device A1 and the mixed solution drying zone Dry1 using the recording medium production device according to the present example, the obtained recording medium is allowed to pass through the ink jet ink applying device IJ1 and the ink drying zone Dry2 without applying and drying ink in the ink jet ink applying device IJ1 and the ink drying zone Dry2, and the recording medium is finally wound using the winding device W2, thereby obtaining a roll body of a recording medium on which an image has not been recorded.

Next, the roll body of the recording medium is set in the unwinding device W1, the recording medium is unwound by the unwinding device W1, the unwound recording medium is allowed to pass through the mixed solution applying device A1 and the mixed solution drying zone Dry1 without applying and drying the mixed solution in the mixed solution applying device A1 and the mixed solution drying zone Dry1, and the ink is applied and dried in the ink jet ink applying device IJ1 and the ink drying zone Dry2 to record an image, thereby obtaining a recording medium on which an image has been recorded.

According to the image recording in the mode Y, the time taken from the application of the mixed solution onto the impermeable base material to the application of the ink can be adjusted by adjusting the time taken from obtaining the roll body of the recording medium to unwinding the recording medium using the unwinding device W1 again, in addition to or in place of the adjustment of the transport speed of the impermeable base material.

As described in the image recording in the above-described mode Y, the recording medium production device according to the present example can also be used for producing a recording medium on which an image has not been recorded.

Further, in the recording medium production device according to this example, even in a case where the ink jet ink applying device IJ1 and the ink drying zone Dry2 have not been provided, a recording medium on which an image has not been recorded can be produced. The recording medium production device in this case is an example of a recording medium production device which does not have the image recording function.

EXAMPLES

Hereinafter, the present invention will be described in more detail based on examples, but the present invention is not limited to the following examples unless the gist thereof is overstepped.

Hereinafter, "parts" and "%" are on a mass basis unless otherwise specified.

Example 1

<Production of Recording Medium>
A liquid A having the following composition and a liquid B having the following composition were respectively prepared.

Composition of Liquid A
Malonic acid (manufactured by Wako Pure Chemical Industries, Ltd., organic acid): 20% by mass
1,2-propanediol (hereinafter, also referred to as "PG") (manufactured by Wako Pure Chemical Industries, Ltd.): 20% by mass
Anti-foaming agent 1 (TSA-739 (15% by mass), manufactured by Momentive Performance Materials Japan LLC, emulsion type silicone anti-foaming agent): 0.02% by mass
Water: remaining amount set such that total amount of liquid A was 100% by mass
—Composition of Liquid B—
PE1 (aqueous dispersion liquid "Eastek™ 1200" of polyester resin particles (volume average particle diameter of 30 nm), manufactured by Eastman Chemical Company): 15% by mass as amount of resin
Water: remaining amount set such that total amount was 100% by mass First, the liquid B was supplied to a container having a volume of 5 L (the area of the liquid surface of the liquid accommodated was 0.05 m$^2$), and the liquid A was supplied and mixed to obtain 3 L of a mixed solution. The mixing volume ratio [liquid A/liquid B] was as listed in Table 1. The liquid A was mixed with the liquid B under conditions of an ambient temperature of 25° C. and an ambient humidity of 55% in an air atmosphere.

The obtained mixed solution was stored under conditions of an ambient temperature of 25° C. and an ambient humidity of 55% in an air atmosphere.

The storage of the mixed solution was performed in a state where the above-described container was set as a closed system.

A recording medium was obtained by using the mixed solution after storage, a polyethylene terephthalate (PET) base material as an impermeable base material, and a recording medium production device having an image recording function illustrated in FIG. 1, coating the impermeable base material with the mixed solution after the storage, and drying the mixed solution.

Hereinafter, detailed operations will be described based on the reference numerals in FIG. 1.

The following operation was also performed under conditions of an ambient temperature of 25° C. and an ambient humidity of 55% in an air atmosphere. However, the film surface temperature of an impermeable base material S1 in the mixed solution drying zone Dry1 and the ink drying zone Dry2 is the temperature described below (for example, 80° C.).

First, a roll body (hereinafter, also referred to as a "roll body 1") in which the impermeable base material S1 (PET base material "FE2001", manufactured by Futamura Chemical Co., Ltd.) having a thickness of 25 μm, a width of 500 mm, and a length of 2000 m was wound in a roll shape was prepared. The roll body 1 was set in the unwinding device W1. Further, the mixed solution after the storage described above was supplied to the mixed solution applying device A1.

The impermeable base material S1 was unwound from the roll body 1 by the unwinding device W1, and the unwound impermeable base material S1 was transported at a transport speed of 500 mm/sec.

One surface of the impermeable base material S1 during the transport was entirely coated with the mixed solution after the storage using a mixed solution applying device A1 (a wire bar coater was used in the examples) such that the mass of the mixed solution to be applied per unit area was set to 1.7 g/m². The applied mixed solution was dried at a film surface temperature of 80° C. for 20 seconds by blowing warm air in a mixed solution drying zone Dry1.

As described above, a recording medium was obtained as the impermeable base material S1 after passing through the mixed solution drying zone Dry1 in FIG. 1.

The obtained recording medium was allowed to pass through the ink applying device IJ1 and the ink drying zone Dry2 without applying and drying the ink and was wound by a winding device W2 under conditions of a winding pressure (surface pressure) of 50 kPa. The wound recording medium (hereinafter, also referred to as a "roll body 2") was allowed to stand at room temperature (25° C.) for one day.

In the above-described operation, the time taken from the start of mixing the liquid A with the liquid B to the start of coating the impermeable base material with the mixed solution was set as listed in the columns of "time taken from start of mixing to start of application of mixed solution" in Table 1.

Further, the impermeable base material was coated with the mixed solution under conditions of an ambient temperature of 25° C. and an ambient humidity of 55% in an air atmosphere.

Further, Mw2/Mw1 was as listed in Table 1.

Mw1 represents the weight-average molecular weight of the resin in the liquid B before being mixed with the liquid A, and Mw2 represents the weight-average molecular weight of the resin in the mixed solution immediately before the impermeable base material is coated with the mixed solution (specifically, the time point after one minute earlier than the time point of the application of the mixed solution and before the time point of the application).

<Evaluation of Transfer of Component>

The recording medium (roll body 2) which had been allowed to stand at room temperature (25° C.) for one day was unwound, the presence or absence of transfer of the component to the rear surface (that is, the surface on a side opposite to the surface to which the mixed solution had been applied) of the recording medium was visually confirmed, and the transfer amount of the component was evaluated according to the following measurement method.

Specifically, an A4-sized rectangular sample (29.7 cm in the length direction of the recording medium, and 21 cm in the width direction of the recording medium) was cut out at a position of 1000 m from the end portion of the wound recording medium in the length direction, the transfer amount of the component in the cut-out sample was measured according to the following method, and the arithmetic average value of the transfer amount of the component was calculated.

The position at which the A4-sized sample was cut out from the recording medium was set as a position where the center of the A4-sized sample in the length direction coincided with the above-described position of 1000 m and the center of the A4-sized sample in the width direction coincided with the center of the recording medium in the width direction.

(Method of Measuring Transfer Amount of Component)

The transfer amount of the component was measured using MigraCell (registered trademark) MC150 (manufactured by FABES Forschungs-GmbH).

Specifically, the sample was set on MC150 such that the rear surface of the sample was the extraction surface, 20 mL of a solvent (methanol/water=1:1 (volume ratio)) was added thereto, and the sample was covered and allowed to stand for 1 day. The set position was set as a position where the center of the sample and the center of the extraction region in MC150 visually overlapped each other.

After completion of the standing, the solvent was taken out and dried. The transfer of the component was evaluated based on the following evaluation standards by dividing the mass of the dried product of the solvent by the extraction area (2.0 dm²) to calculate the extraction amount of the recording medium per unit area (the transfer amount of the component, mg/dm²).

The results are listed in Table 1.

In the following evaluation standards, a case where the transfer of the component is most suppressed is ranked to "5".

—Evaluation Standards for Transfer of Component—

5: Transferred materials were not able to be visually confirmed, and the transfer amount was 0.01 mg/dm² or less.

4: Transferred materials were not able to be visually confirmed, and the transfer amount was greater than 0.01 mg/dm² and 0.5 mg/dm² or less.

3: Transferred materials were not able to be visually confirmed, and the transfer amount was greater than 0.5 mg/dm² and 5 mg/dm² or less.

2: Transferred materials were able to be partially visually confirmed.

1: Transferred materials were able to be visually confirmed over the entire surface.

<Evaluation of Image Quality>

An image was recorded by coating the impermeable base material with the mixed solution, drying the mixed solution to produce a recording medium, applying the ink onto the front surface (the surface on a side where the mixed solution was applied) of the produced recording medium, and drying the ink.

Specifically, the same operation as in the above-described "production of recording medium" was performed except that the following points were changed.

(Summary of changes from "production of recording medium" described above)

The transport speed of the impermeable base material S1 was changed to 635 mm/sec.

The condition for drying the mixed solution was changed to a film surface temperature of 50° C. for 2 seconds.

A character image was recorded by applying the ink (specifically, cyan ink 1 described below) onto the impermeable base material S1 (recording medium) after passing through the mixed solution drying zone Dry1 using the ink applying device IJ1 and drying the ink in the ink drying zone Dry2.

The time taken from completion of the application of the mixed solution onto the impermeable base material S1 to the application of the ink is as listed in the columns of "time taken from completion of application of mixed solution to start of application of ink" in Table 1.

(Ink)

Cyan ink 1 having the following composition was used as the ink in the evaluation of the image quality.

—Composition of Cyan Ink—

Projet Cyan APD1000 (manufactured by FUJIFILM Imaging Colorants Inc., cyan pigment dispersion liquid, pigment concentration: 12%): 2.4% by mass as solid content 1,2-PD (organic solvent A; 1,2-propanediol, vapor pressure at 20° C. ("20° C. VP" in Table 1) 0.01 kPa, SP value of 35 MPa'$^{12}$, manufactured by Wako Pure Chemical Industries, Ltd.): 20% by mass OLFINE E1010 (surfactant, manufactured by Nissan Chemical Co., Ltd.): 1% by mass Self-dispersing polymer particles B-01 (resin particles) synthesized as follows: 8% by mass SNOWTEX (registered trademark) XS (manufactured by Nissan Chemical Co., Ltd., colloidal silica): 0.06% by mass as solid content of silica Water: remaining amount set such that total amount was 100% by mass —Synthesis of Self-dispersing Polymer Particles B-01—

Self-dispersing polymer particles B-01 were produced in the following manner.

A 2 L three-neck flask provided with a stirrer, a thermometer, a reflux cooling pipe, and a nitrogen gas introduction pipe was charged with 560.0 g of methyl ethyl ketone, and the solution was heated to 87° C. Next, a mixed solution consisting of 220.4 g of methyl methacrylate, 301.6 g of isobornyl methacrylate, 58.0 g of methacrylic acid, 108 g of methyl ethyl ketone, and 2.32 g of "V-601" (polymerization initiator, manufactured by Wako Pure Chemical Industries, Ltd., dimethyl 2,2'-azobis(2-methyl propionate)) was added dropwise to the methyl ethyl ketone in the reaction container at a constant speed such that the dropwise addition was completed for 2 hours while the reflux state in the reaction container was maintained (hereinafter, the reflux state was maintained until the reaction was completed). After completion of the dropwise addition, the solution was stirred for 1 hour, and the operation of the following step (1) was performed on the solution after being stirred for 1 hour.

Step (1): A solution consisting of 1.16 g of "V-601" and 6.4 g of methyl ethyl ketone was added to the solution, and the solution was stirred for 2 hours.

Next, the operation of the step (1) was repeatedly performed four times, a solution consisting of 1.16 g of "V-601" and 6.4 g of methyl ethyl ketone was added to the solution, and the resulting solution was stirred for 3 hours (the operation carried out so far is referred to as the "reaction").

After completion of the reaction, the temperature of the solution was decreased to 65° C., 163.0 g of isopropanol was added to the solution, and the solution was allowed to be naturally cooled, thereby obtaining a polymerization solution (concentration of solid contents: 41.0%) containing a copolymer of methyl methacrylate, isobornyl methacrylate, and methacrylic acid (=38/52/10 [mass ratio]).

The weight-average molecular weight (Mw) of the copolymer was 63000, and the acid value thereof was 65.1 (mgKOH/g).

Next, 317.3 g (concentration of solid contents: 41.0%) of the obtained polymerization solution was weighed, 46.4 g of isopropanol, 1.65 g of a 20% maleic anhydride aqueous solution (water-soluble acidic compound, corresponding to the amount of 0.3% as maleic acid with respect to the copolymer), and 40.77 g of a 2 mol/L NaOH aqueous solution were added to the solution, and the temperature of the liquid in the reaction container was increased to 70° C.

Next, 380 g of distilled water was added dropwise to the solution, which had been heated to 70° C., at a speed of 10 mL/min, and water dispersion was performed.

Thereafter, a total amount of 287.0 g of isopropanol, methyl ethyl ketone, and distilled water was distilled off by maintaining the temperature of the liquid in the reaction container at 70° C. for 1.5 hours under reduced pressure (solvent removal step). 0.278 g (440 ppm as benzisothiazolin-3-one as the solid content in the polymer) of PROXEL GXL (S) (manufactured by Arch Chemicals, Inc.) was added to the obtained liquid.

The obtained liquid was filtered using a filter having a mesh diameter of 1 and the filtrate was collected, thereby obtaining an aqueous dispersion containing self-dispersing polymer particles B-01 whose concentration of solid contents was 26.5% by mass.

(Details of Conditions for Applying Ink)

Ink jet head in ink applying device IJ1: A head in which four colors of 1200 dpi (dot per inch, 1 inch indicates 2.54 cm)/20-inch width piezo full line heads were disposed was used.

Ink droplet amount: Each amount was set to 2.4 pL.

Driving frequency: 30 kHz (base material transport speed of 635 mm/sec)

(Details of Conditions for Drying Ink)

Drying method in ink drying zone Dry2: drying by heating with warm air

Drying conditions: 80° C. for 30 seconds (Details of Recorded Character Image)

The character images recorded on the recording medium were the character images (unicode: U+9DF9; 2 pt, 3 pt, 4 pt, and 5 pt) shown in FIG. 2. Here, pt indicates the DTP point representing the font size, and 1 pt is 1/72 inch.

(Method of Evaluating Image Quality)

The character image recorded on the recording medium was observed, and the image quality was evaluated according to the following evaluation standards.

The results are listed in Table 1.

In the following evaluation standards, a case where the image quality is most excellent is ranked as "5".

—Evaluation Standards for Image Quality—

5: 2 pt characters were able to be reproduced.

4: 3 pt characters were able to be reproduced, but 2 pt characters were not able to be reproduced.

3: 4 pt characters were able to be reproduced, but 3 pt characters were not able to be reproduced.

2: 5 pt characters were able to be reproduced, but 4 pt characters were not able to be reproduced.

1: 5 pt characters were not able to be reproduced.

Figure 2:
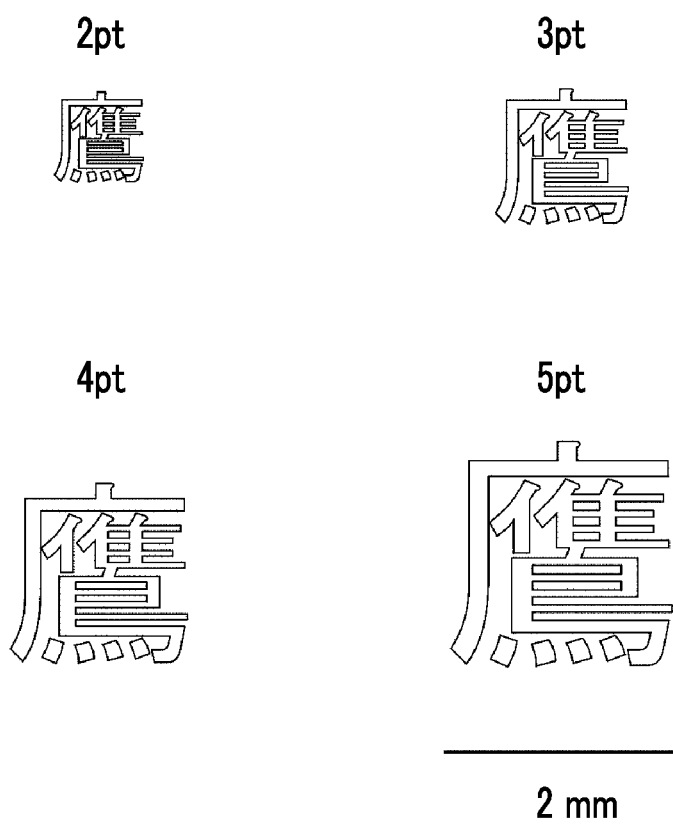
FIG. 2 is a view conceptually showing character images used for evaluation of the image quality in examples.
Figure 3:
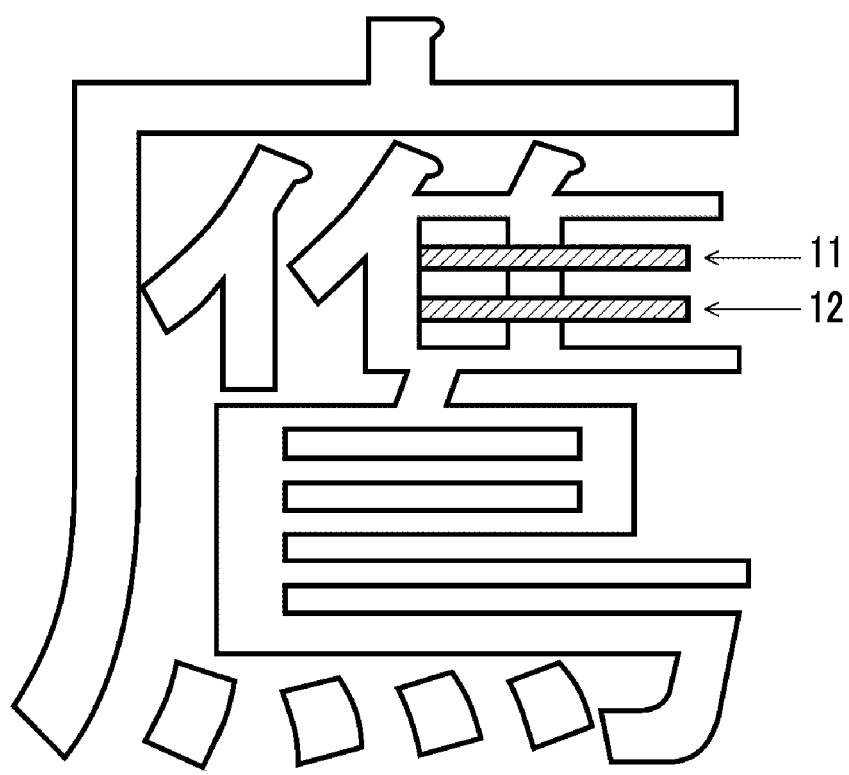
FIG. 3 is a view for describing the details of the evaluation standards for the image quality in the examples.

Further, the expression "able to be reproduced" means that the horizontal line indicated by 11 shown in FIG. 3 and the horizontal line indicated by 12 shown in FIG. 3 in the character images shown in FIG. 2 were separated in a case where the characters were confirmed from a place separated by 0.5 m.

<Evaluation of Adhesiveness>

A solid image (cyan solid image) was recorded on the recording medium under the same conditions as those for the evaluation of the image quality except that a solid image was recorded in place of a character image.

The adhesiveness of the image was evaluated by attaching a piece of Cellotape (registered trademark, No. 405, manufactured by Nichiban Co., Ltd., width of 12 mm, hereinafter, also simply referred to as "tape") onto the recorded solid image and peeling the piece of tape off from the image.

Specifically, the tape was attached and peeled off according to the following method.

The tape was taken out at a constant speed and cut to have a length of approximately 75 mm, thereby obtaining a piece of tape.

The obtained piece of tape was superimposed on the solid image, and a region in the piece of tape at a center with a width of 12 nm and a length of 25 mm was attached onto the image using a finger and rubbed firmly with a fingertip.

An end of the piece of tape was grasped in 5 minutes after the piece of tape was attached onto the image and was peeled off from the image at an angle as close as possible to 60° for 0.5 to 1.0 seconds.

The presence or absence of adhesive matter on the piece of peeled tape and the presence or absence of peeling of the solid image on the recording medium were visually observed, and the adhesiveness of the image was evaluated according to the following evaluation standards.

The results are listed in Table 1.

In the following evaluation standards, a case where the adhesiveness is most excellent is ranked as "5".

—Evaluation Standards for Adhesiveness—

5: Adhesive matter was not found on the piece of tape, and peeling of the image on the recording medium was not found.

4: A small amount of colored adhesive matter was found on the piece of tape, but peeling of the image on the recording medium was not found.

3: A small amount of colored adhesive matter was found on the piece of tape, and slight peeling of the image on the recording medium was found, but it was in a practically acceptable range.

2: Colored adhesive matter was found on the piece of tape, peeling of the image on the recording medium was found, and it was out of a practically acceptable range.

1: Colored adhesive matter was found on the piece of tape, most of the image on the recording medium was peeled off, and the recording medium was visually recognized.

Examples 2 to 24

The same operation as in Example 1 was performed except that at least one of the composition of the liquid A, the composition of the liquid B, the mixing volume ratio [liquid A/liquid B], or the time taken from the start of mixing to the start of application of the mixed solution was changed as listed in Table 1.

The results are listed in Table 1.

Examples 25 and 26

The same operation as in Example 1 was performed except for the following points.

The results are listed in Table 1.

—Changes from Example 1—

The evaluation of the image quality and the evaluation of the adhesiveness were performed using the recording medium (roll body 2) obtained in the "production of recording medium" in Example 1.

The roll body 2 was stored under the conditions of an ambient temperature of 25° C. and an ambient humidity of 55%. The time for storing the roll body 2 was adjusted such that the time taken from the completion of the application of the mixed solution to the start of the application of the ink was set as the time listed in Table 1.

The recording medium was unwound from the roll body 2 after the storage, and a character image for evaluating the image quality and a solid image for evaluating the adhesiveness were respectively recorded on the unwound recording medium under the same conditions as those in Example 1. The evaluation of the image quality and the evaluation of the adhesiveness were performed using the recorded character image and solid image.

Comparative Examples 1 to 6

The same operation as in Example 1 was performed except that the combination of the composition of the liquid A, the composition of the liquid B, the mixing volume ratio [liquid A/liquid B], and the time taken from the start of mixing to the start of application of the mixed solution was changed as listed in Table 1.

The results are listed in Table 1.

TABLE 1

| | Liquid A | | | | | | | | Liquid B | | | | Mixing volume ratio [liquid A/ liquid B] | Nw2/Mw1 | Time taken from start of mixing to start of application of mixed solution | Time taken from completion of application of mixed solution to start of application of ink | Evaluation results | | |
|---|---|---|---|---|---|---|---|---|---|---|---|---|---|---|---|---|---|---|---|
| | Aggregating agent | | Solvent | | Anti-foaming agent | | | Water | Resin | | | Water | | | | | Transfer of component | Image quality | Adhesive-ness |
| | Type | Amount (% by mass) | Type | Amount (% by mass) | Type | Amount (% by mass) | | Amount | Type | Amount (% by mass) | | Amount | | | | | | | |
| Example 1 | Malonic acid | 20 | PG | 20 | Anti-foaming agent 1 | 0.02 | | Remainder | PE1 | 15 | | Remainder | 1.0 | 0.89 | 10 minutes | 5 seconds | 3 | 5 | 3 |
| Example 2 | Malonic acid | 20 | PG | 20 | Anti-foaming agent 1 | 0.02 | | Remainder | PE1 | 15 | | Remainder | 1.0 | 0.86 | 30 minutes | 5 seconds | 5 | 5 | 5 |
| Example 3 | Malonic acid | 20 | PG | 20 | Anti-foaming agent 1 | 0.02 | | Remainder | PE1 | 15 | | Remainder | 1.0 | 0.80 | 5 days | 5 seconds | 5 | 5 | 5 |
| Example 4 | Malonic acid | 20 | PG | 20 | Anti-foaming agent 1 | 0.02 | | Remainder | PE1 | 15 | | Remainder | 1.0 | 0.79 | 10 days | 5 seconds | 5 | 5 | 5 |
| Example 5 | Malonic acid | 20 | PG | 20 | Anti-foaming agent 1 | 0.02 | | Remainder | PE1 | 15 | | Remainder | 1.0 | 0.72 | 20 day | 5 seconds | 4 | 5 | 5 |
| Example 6 | Malonic acid | 20 | PG | 20 | Anti-foaming agent 1 | 0.02 | | Remainder | PE1 | 15 | | Remainder | 1.0 | 0.68 | 10 days | 5 seconds | 3 | 5 | 3 |
| Example 7 | Malonic acid | 30 | PG | 30 | Anti-foaming agent 1 | 0.03 | | Remainder | PE1 | 11.3 | | Remainder | 0.5 | 0.75 | 10 days | 5 seconds | 5 | 5 | 5 |
| Example 8 | Malonic acid | 40 | PG | 40 | Anti-foaming agent 1 | 0.04 | | Remainder | PE1 | 10 | | Remainder | 0.33 | 0.74 | 10 days | 5 seconds | 4 | 5 | 5 |
| Example 9 | Malonic acid | 14 | PG | 14 | Anti-foaming agent 1 | 0.01 | | Remainder | PE1 | 26.3 | | Remainder | 2.5 | 0.80 | 10 days | 5 seconds | 5 | 5 | 5 |
| Example 10 | Malonic acid | 13.3 | PG | 13.3 | Anti-foaming agent 1 | 0.01 | | Remainder | PE1 | 30 | | Remainder | 3.0 | 0.82 | 10 days | 5 seconds | 4 | 5 | 5 |
| Example 11 | Malonic acid | 20 | PG | 20 | Anti-foaming agent 1 | 0.02 | | Remainder | PE1 | 15 | | Remainder | 1.0 | 0.73 | 10 days | 5 seconds | 5 | 5 | 5 |
| Example 12 | Metal complex 1 | 20 | PG | 20 | Anti-foaming agent 1 | 0.02 | | Remainder | PE1 | 15 | | Remainder | 1.0 | 0.77 | 10 days | 5 seconds | 5 | 3 | 5 |
| Example 13 | Malonic acid | 20 | PG | 20 | Anti-foaming agent 1 | 0.02 | | Remainder | PU1 | 15 | | Remainder | 1.0 | 0.94 | 10 minutes | 5 seconds | 3 | 5 | 3 |

TABLE 1-continued

| | Liquid A | | | | | | Liquid B | | | Mixing volume ratio [liquid A/ liquid B] | Nw2/Mw1 | Time taken from start of mixing to start of application of mixed solution | Time taken from completion of application of mixed solution to start of application of ink | Evaluation results | | |
|---|---|---|---|---|---|---|---|---|---|---|---|---|---|---|---|---|
| | Aggregating agent | | Solvent | | Anti-foaming agent | | Resin | | Water Amount | | | | | Transfer of component | Image quality | Adhesive-ness |
| | Type | Amount (% by mass) | Type | Amount (% by mass) | Type | Amount (% by mass) | Water Amount | Type | Amount (% by mass) | | | | | | | |
| Example 14 | Malonic acid | 20 | PG | 20 | Anti-foaming agent 1 | 0.02 | Remainder | PU1 | 15 | Remainder | 1.0 | 0.93 | 30 minutes | 5 seconds | 5 | 5 | 5 |
| Example 15 | Malonic acid | 20 | PG | 20 | Anti-foaming agent 1 | 0.02 | Remainder | PU1 | 15 | Remainder | 1.0 | 0.87 | 10 days | 5 seconds | 5 | 5 | 5 |
| Example 16 | Malonic acid | 20 | PG | 20 | Anti-foaming agent 1 | 0.02 | Remainder | PU1 | 20 | Remainder | 1.0 | 0.86 | 10 days | 5 seconds | 5 | 5 | 5 |
| Example 17 | Malonic acid | 30 | PG | 30 | Anti-foaming agent 1 | 0.03 | Remainder | PU1 | 15 | Remainder | 0.5 | 0.84 | 10 days | 5 seconds | 5 | 5 | 5 |
| Example 18 | Malonic acid | 40 | PG | 40 | Anti-foaming agent 1 | 0.04 | Remainder | PU1 | 13.3 | Remainder | 0.3 | 0.83 | 10 days | 5 seconds | 4 | 5 | 5 |
| Example 19 | Malonic acid | 14 | PG | 14 | Anti-foaming agent 1 | 0.01 | Remainder | PU1 | 35 | Remainder | 2.5 | 0.88 | 10 days | 5 seconds | 5 | 5 | 5 |
| Example 20 | Malonic acid | 13.3 | PG | 13.3 | Anti-foaming agent 1 | 0.01 | Remainder | PU1 | 40 | Remainder | 3.0 | 0.88 | 10 days | 5 seconds | 4 | 5 | 4 |
| Example 21 | CaCl$_2$ | 20 | PG | 20 | Anti-foaming agent 1 | 0.02 | Remainder | AC1 | 15 | Remainder | 1.0 | 0.96 | 10 days | 5 seconds | 3 | 5 | 5 |
| Example 22 | CaCl$_2$ | 20 | PG | 20 | Anti-foaming agent 1 | 0.02 | Remainder | PE1 | 15 | Remainder | 1.0 | 0.88 | 10 days | 5 seconds | 5 | 4 | 4 |
| Example 23 | CaCl$_2$ | 20 | PG | 20 | Anti-foaming agent 1 | 0.02 | Remainder | PU1 | 15 | Remainder | 1.0 | 0.92 | 10 days | 5 seconds | 5 | 4 | 5 |
| Example 24 | CaCl$_2$ | 20 | PG | 20 | Anti-foaming agent 1 | 0.02 | Remainder | AC1 | 15 | Remainder | 1.0 | 0.98 | 10 days | 5 seconds | 3 | 4 | 4 |
| Example 25 | Malonic acid | 20 | PG | 20 | Anti-foaming agent 1 | 0.02 | Remainder | PE1 | 15 | Remainder | 1.0 | 0.82 | 10 days | 30 days | 5 | 5 | 5 |
| Example 26 | Malonic acid | 20 | PG | 20 | Anti-foaming agent 1 | 0.02 | Remainder | PE1 | 15 | Remainder | 1.0 | 0.82 | 10 days | 65 days | 5 | 3 | 4 |
| Comparative Example 1 | Malonic acid | 20 | PG | 20 | Anti-foaming agent 1 | 0.02 | Remainder | PE1 | 15 | Remainder | 1.0 | 0.42 | 40 days | 5 seconds | 1 | 5 | 1 |

TABLE 1-continued

| | Aggregating agent | | Liquid A | | | Anti-foaming agent | | | Liquid B | | | | Mixing volume ratio [liquid A/liquid B] | Nw2/Mw1 | Time taken from start of mixing to start of application of mixed solution | Time taken from completion of application of mixed solution to start of application of ink | Evaluation results | | |
|---|---|---|---|---|---|---|---|---|---|---|---|---|---|---|---|---|---|---|---|
| | | | Solvent | | | | | Water | Resin | | Water | | | | | | Transfer of component | Image quality | Adhesiveness |
| | Type | Amount (% by mass) | Type | Amount (% by mass) | | Type | Amount (% by mass) | Amount | Type | Amount (% by mass) | Amount | | | | | | | | |
| Comparative Example 2 | Malonic acid | 20 | PG | 20 | | Anti-foaming agent 1 | 0.02 | Remainder | PU1 | 15 | Remainder | 1.0 | 0.65 | 40 days | 5 seconds | 2 | 5 | 2 |
| Comparative Example 3 | Malonic acid | 20 | PG | 20 | | Anti-foaming agent 1 | 0.02 | Remainder | AC1 | 15 | Remainder | 1.0 | 0.87 | 40 days | 5 seconds | 2 | 5 | 4 |
| Comparative Example 4 | CaCl$_2$ | 20 | PG | 20 | | Anti-foaming agent 1 | 0.02 | Remainder | PE1 | 15 | Remainder | 1.0 | 0.67 | 40 days | 5 seconds | 1 | 4 | 2 |
| Comparative Example 5 | CaCl$_2$ | 20 | PG | 20 | | Anti-foaming agent 1 | 0.02 | Remainder | PU1 | 15 | Remainder | 1.0 | 0.78 | 40 days | 5 seconds | 2 | 4 | 3 |
| Comparative Example 6 | CaCl$_2$ | 20 | PG | 20 | | Anti-foaming agent 1 | 0.02 | Remainder | AC1 | 15 | Remainder | 1.0 | 0.92 | 40 days | 5 seconds | 2 | 4 | 4 |

Details of each component in Table 1 are as follows.
—Specific Aggregating Agent—
Metal complex 1: "ORGATIX TC-310" (manufactured by Matsumoto Fine Chemical Co., Ltd., titanium lactate)
$CaCl_2$: $CaCl_2$ (manufactured by Wako Pure Chemical Industries, Ltd.)
Malonic acid: Malonic acid (manufactured by Wako Pure Chemical Industries, Ltd.)
Malic acid: Malic acid (manufactured by Wako Pure Chemical Industries, Ltd.)
—Solvent—
PG: Propylene glycol (manufactured by Wako Pure Chemical Industries, Ltd.)
—Anti-Foaming Agent—
Anti-foaming agent 1: "TSA-739", manufactured by Momentive Performance Materials Japan LLC (aqueous dispersion liquid of emulsion type silicone anti-foaming agent, solid content of 15%) (amount in Table 1 is amount as solid content)
—Resin—
PE1: "Eastek 1200" (manufactured by Eastman Chemical Company, aqueous dispersion of polyester resin particles (volume average particle diameter of 30 nm) (amount in Table 1 is amount as solid content)
PU1: "SUPERFLEX 500M" (manufactured by DKS Co., Ltd., aqueous dispersion liquid of nonionic polyurethane resin particles (volume average particle diameter of 140 nm)) (amount in Table 1 is amount as solid content)
AC1: "EM57DOC" (manufactured by Daicel FineChem Ltd., acrylic resin particles (volume average particle diameter of 70 nm))

As listed in Table 1, in Examples 1 to 26 in which the time taken from the start of mixing to the start of application of the mixed solution was 30 days or shorter, that is, in Examples 1 to 26 in which the mixed solution after the storage was applied onto the impermeable base material in 30 days after the start of mixing the liquid A with the liquid B, the transfer of the components was suppressed and the image quality of the recorded images was excellent. Further, the adhesiveness of the images was excellent.

On the contrary, in Comparative Examples 1 to 6 in which the time taken from the start of mixing to the start of the application of the mixed solution was longer than 30 days, the transfer of the components was not able to be suppressed.

In particular, in Comparative Examples 1, 2, 4, and 5 in which a polyester resin and a polyurethane resin were used as the resins in the liquid B and the time taken from the start of mixing to the start of the application of the mixed solution was longer than 30 days, the transfer of the components was significant and the adhesiveness of images was also degraded as respectively compared with Examples 1, 13, 22, and 23 in which a polyester resin and a polyurethane resin were used and the time taken from the start of mixing to the start of the application of the mixed solution was 30 days or shorter. Based on this result, in Comparative Examples 1, 2, 4, and 5, it was considered that hydrolysis of the polyester resin or the polyurethane resin occurred, and the function of the resin was significantly degraded.

As shown in the results of Examples 1 and 2, it was found that the transfer of the components was further suppressed in a case where the time taken from the start of mixing to the start of the application of the mixed solution was 30 minutes or longer (Example 2).

As shown in the results of Examples 4 and 5, it was found that the transfer of the components was further suppressed in a case where the time taken from the start of mixing to the start of the application of the mixed solution was 10 days or shorter (Example 4).

As shown in the results of Examples 7 and 8, it was found that the transfer of the components was further suppressed in a case where the mixing volume ratio [liquid A/liquid B] was 0.5 or greater (Example 7).

As shown in the results of Examples 9 and 10, it was found that the transfer of the components was further suppressed in a case where the mixing volume ratio [liquid A/liquid B] was 2.5 or less (Example 9).

As shown in the results of Examples 4, 11, 12, and 22, it was found that the image quality was further excellent in a case where the specific aggregating agent in the liquid A was an organic acid (Examples 4 and 11).

As shown in the results of Examples 4, 15, and 21, it was found that the transfer of the components was further suppressed and the adhesiveness was further improved in a case where the resins in the liquid B included at least one of a polyester resin or a polyurethane resin (Examples 4 and 15).

Further, based on the comparison between Example 4 and Comparative Example 1 (polyester resin), the comparison between Example 15 and Comparative Example 2 (polyurethane resin), and the comparison between Example 21 and Comparative Example 3 (acrylic resin), the range of improvement in the transfer of the components and the range of improvement in adhesiveness were larger than those in Example 21 in a case where the resins in the liquid B included at least one of a polyester resin or a polyurethane resin (Examples 4 and 15).

As shown in the results of Examples 5 and 6, it was found that the transfer of the components was further suppressed in a case where Mw2/Mw1 was in a range of 0.70 to 1.00 (Example 5).

As shown in the results of Examples 25 and 26, it was found that the transfer of the components was further suppressed and the adhesiveness was further improved in a case where the time taken from the application of the mixed solution to the application of the ink was within 60 days (Example 25).

As described above, the embodiment groups using cyan ink as the ink have been described. In these embodiment groups, even in a case where the cyan ink was changed to an ink other than the cyan ink (for example, magenta ink, yellow ink, or black ink) or a case where a multicolor image was recorded using cyan ink and at least one ink other than the cyan ink, it goes without saying that the same effects as those of the above-described embodiment groups can be obtained.

The disclosure of JP2018-018590 filed on Feb. 5, 2018 is incorporated herein by reference in its entirety.

In a case where all documents, patent applications, and technical standards described in the present specification are specified to be incorporated specifically and individually as cited documents, the documents, patent applications, and technical standards are incorporated herein in the same limited scope as the cited documents.

What is claimed is:
1. A method of producing a recording medium, comprising:
   a step of preparing a liquid A which includes at least one kind of aggregating agent selected from the group consisting of an acid, a polyvalent metal compound, and a metal complex, and water;
   a step of preparing a liquid B which includes a resin and water;

a step of mixing the liquid A with the liquid B at an ambient temperature of 5° C. to 40° C. to obtain a mixed solution;

a step of storing the mixed solution at an ambient temperature of 5° C. to 40° C.; and a step of applying the mixed solution after the storage onto an impermeable base material within 30 days from start of mixing the liquid A with the liquid B, thereby obtaining the recording medium;

wherein in a case where a weight-average molecular weight of the resin in the liquid B after the step of preparing the liquid B and before the step of obtaining the mixed solution is set as Mw1 and a weight-average molecular weight of the resin in the mixed solution immediately before the application of the mixed solution onto the impermeable base material is set as Mw2, Mw2/Mw1 is in a range of 0.70 to 1.00;

wherein liquid A does not include the resin of liquid B; and the content of the at least one kind of aggregating agent in the liquid A is in a range of 4% by mass to 50% by mass with respect to the total amount of the liquid A; and the content of the resin in the liquid B is in a range of 5% by mass to 50% by mass with respect to the total amount of the liquid B.

2. The method of producing the recording medium according to claim 1, wherein the step of obtaining the recording medium is a step of applying the mixed solution after the storage onto the impermeable base material after 30 minutes and within 10 days from the start of mixing the liquid A with the liquid B to obtain the recording medium.

3. The method of producing the recording medium according to claim 1, wherein the step of obtaining the mixed solution is the step of mixing the liquid A with the liquid B such that a mixing volume ratio of the liquid A to the liquid B is in a range of 0.5 to 2.5 to obtain the mixed solution.

4. The method of producing the recording medium according to claim 1, wherein the aggregating agent includes an organic acid.

5. The method of producing the recording medium according to claim 1, wherein the resin includes at least one of a polyester resin or a polyurethane resin.

6. An image recording method comprising:

a step of producing the recording medium using the method of producing the recording medium according to claim 1; and a step of applying an ink which includes a colorant and water onto the produced recording medium and recording an image.

7. The image recording method according to claim 6, wherein the application of the ink is started within 60 days after the application of the mixed solution after the storage onto the impermeable base material is completed.

8. The method of producing a recording medium according to claim 1, wherein the liquid A further includes a polyhydric alcohol.

9. The method of producing a recording medium according to claim 1, wherein the step of mixing the liquid A with the liquid B is performed at an ambient temperature of 5° C. to 30° C.

* * * * *